US012355164B2

(12) United States Patent
Ito et al.

(10) Patent No.: US 12,355,164 B2
(45) Date of Patent: Jul. 8, 2025

(54) ANTENNA STRUCTURE

(71) Applicant: Mitsubishi Electric Corporation, Tokyo (JP)

(72) Inventors: Yohei Ito, Tokyo (JP); Takeshi Shiode, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 86 days.

(21) Appl. No.: 18/034,887

(22) PCT Filed: Nov. 18, 2020

(86) PCT No.: PCT/JP2020/042942
§ 371 (c)(1),
(2) Date: May 2, 2023

(87) PCT Pub. No.: WO2022/107236
PCT Pub. Date: May 27, 2022

(65) Prior Publication Data
US 2023/0411851 A1 Dec. 21, 2023

(51) Int. Cl.
*H01Q 9/04* (2006.01)
*H01Q 1/38* (2006.01)
*H01Q 1/40* (2006.01)

(52) U.S. Cl.
CPC ............. *H01Q 9/0407* (2013.01); *H01Q 1/38* (2013.01); *H01Q 1/40* (2013.01)

(58) Field of Classification Search
CPC ........... H01Q 9/0407; H01Q 1/38; H01Q 1/02
See application file for complete search history.

(56) References Cited

U.S. PATENT DOCUMENTS 5,757,327 A 5/1998 Yajima et al.
5,900,840 A 5/1999 Yajima
2010/0212198 A1 8/2010 Matsunaga et al.
2018/0350787 A1 12/2018 Kiridoshi
2021/0328335 A1* 10/2021 Kosaka .................... H01Q 1/02
2021/0342665 A1 11/2021 Shimai et al.
2023/0089687 A1* 3/2023 Kwon .................... H01Q 5/307 343/702

FOREIGN PATENT DOCUMENTS

EP 2213931 A1 8/2010
EP 3836026 A1 6/2021
(Continued)

OTHER PUBLICATIONS

International Search Report and Written Opinion mailed on Feb. 9, 2021, received for PCT Application PCT/JP2020/042942, filed on Nov. 18, 2020, 10 pages including English Translation.

*Primary Examiner* — David E Lotter
(74) *Attorney, Agent, or Firm* — XSENSUS LLP

(57) ABSTRACT

An antenna structure (1) includes a structure surface that is a face including a radio wave emitting face including an antenna element (3), a plurality of structure side faces that are faces in contact with the structure surface, and a structure back face that is a face opposite to the structure surface and in contact with the plurality of structure side faces. A first film, which is a single film, is attached to the structure surface, the plurality of structure side faces, and an edge portion of an outer peripheral portion of the structure back face.

7 Claims, 32 Drawing Sheets

(56) References Cited

FOREIGN PATENT DOCUMENTS

| | | | |
|---|---|---|---|
| JP | 4-137802 | A | 5/1992 |
| JP | 9-8518 | A | 1/1997 |
| JP | 2009-65253 | A | 3/2009 |
| JP | 2011-35540 | A | 2/2011 |
| JP | 2011-215641 | A | 10/2011 |
| WO | 2018/138892 | A1 | 8/2018 |
| WO | 2020/032220 | A1 | 2/2020 |

* cited by examiner

ANTENNA STRUCTURE

CROSS-REFERENCE TO RELATED APPLICATION

The present application is based on PCT filing PCT/JP2020/042942, filed Nov. 18, 2020, the entire contents of which are incorporated herein by reference.

TECHNICAL FIELD

The present disclosure relates to an antenna substrate, an antenna structure, and an antenna production method.

BACKGROUND ART

In order to protect an antenna from corrosive atmosphere, moisture, and so on, a method is adopted in which a coating agent is applied to an antenna substrate so as to make the antenna substrate moisture-proof and protect the antenna substrate.

However, for a product that requires gluing or soldering work in assembling an antenna, a moisture-proof process needs to be performed after the antenna is assembled. Therefore, if the antenna has a complex structure, the moisture-proof process is difficult.

CITATION LIST

Patent Literature

Patent Literature 1: JP 2011-215641 A

SUMMARY OF INVENTION

Technical Problem

Patent Literature 1 discloses a surface light emitter that is composed of a bendable substrate including electrical wiring, a plurality of light emitting diode (LED) elements to be placed almost regularly on the substrate, and a top film to be stretched over the surface of the LED elements, where the top film is stretched over the surface of the placed LED elements on the bendable substrate.

According to this disclosure, since the film is attached only to the top face of the substrate, there is a risk that water will enter from the edge of the substrate, and there is also a problem that the film tends to peel off due to a difference in thermal expansion between the substrate and the film.

An object of the present disclosure is to provide an antenna substrate and an antenna structure that can prevent water from entering from the surface and edge portion of the substrate and can reduce a risk that a film will peel off by attaching, to the antenna substrate, a film that is suitably fitted to pits and projections on the substrate and the shape of the substrate.

Solution to Problem

An antenna substrate according to the present disclosure includes a wiring substrate on which electric wiring is formed, the wiring substrate including a radio wave emitting face that is a face including an antenna element, a plurality of substrate side faces that are faces in contact with the radio wave emitting face, and a substrate back face that is a face opposite to the radio wave emitting face and in contact with the plurality of substrate side faces, wherein a first film, which is a single film, is attached to the radio wave emitting face, the plurality of substrate side faces, and an edge portion of an outer peripheral portion of the substrate back face.

An antenna structure according to the present disclosure includes an antenna substrate that includes a wiring substrate on which electric wiring is formed, the wiring substrate including a radio wave emitting face that is a face including an antenna element and a substrate back face that is a face opposite to the radio wave emitting face; and a support to support the antenna substrate and cover at least an outer peripheral portion of the substrate back face, wherein the antenna structure comprises a structure surface that is a face including the radio wave emitting face, a plurality of structure side faces that are faces in contact with the structure surface, and a structure back face that is a face opposite to the structure surface and in contact with the plurality of structure side faces, and wherein a first film, which is a single film, is attached to the structure surface, the plurality of structure side faces, and an edge portion of an outer peripheral portion of the structure back face.

Advantageous Effects of Invention

In an antenna substrate and an antenna structure according to the present disclosure, a film that is suitably fitted to pits and projections on the substrate is attached to the antenna substrate, so that it is possible to prevent water from entering from the surface and edge portion of the substrate and reduce a risk that the film will peel off.

In the antenna structure and the antenna substrate according to the present disclosure, the film covers the substrate and the side faces of a housing of the antenna structure or covers the antenna substrate, so that it is relatively easy to secure waterproofness. In addition, according to the present disclosure, the film covers the edge portion of the substrate, so that this has the effect of reducing water entry into the substrate and moisture absorption of the substrate. Furthermore, the film is wrapped to the back face of a support or the back face of the antenna substrate, so that the present disclosure has the effect of reducing a risk that the film will peel off.

DESCRIPTION OF EMBODIMENTS

In the description and drawings of embodiments, the same elements and corresponding elements are denoted by the same reference sign. The description of elements denoted by the same reference sign will be suitably omitted or simplified.

Embodiment 1

This embodiment will be described in detail below with reference to the drawings.

Description of Configuration

Figure 1:
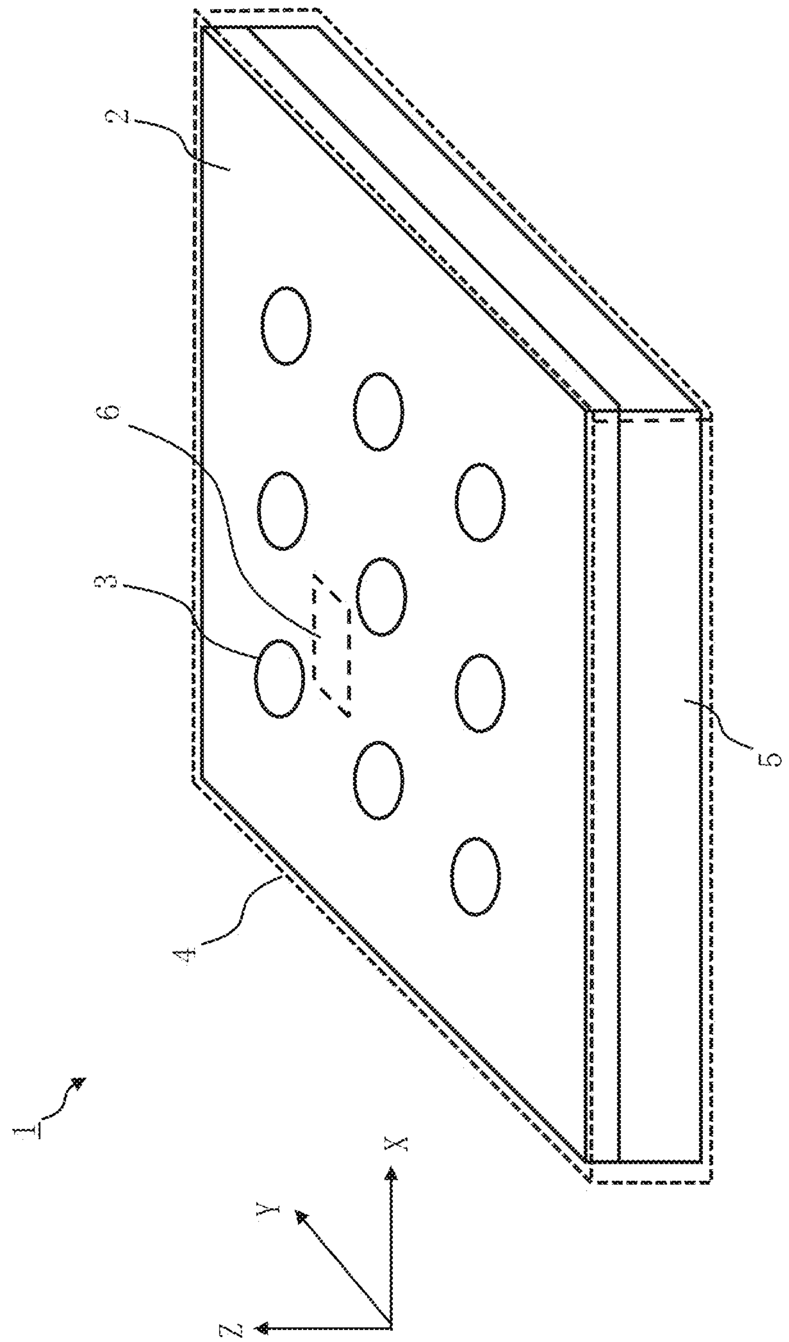
FIG. 1 is a perspective view diagram of an antenna structure 1 according to Embodiment 1.

FIG. 1 illustrates a specific example of a perspective view diagram of an antenna structure 1 according to this embodiment. As illustrated in this figure, the antenna structure 1 includes a wiring substrate 2, an antenna element 3, a film 4, and a support 5. Fold portions of the film 4 are indicated by dashed lines. Although the fold portions are indicated at positions slightly separated from the antenna structure 1, this is a representation to emphasize the fold portions and, in practice, the folds and the antenna structure 1 are in close contact. The dashed lines only schematically indicate the folds of the film, and do not indicate the exact positions and exact shapes of the folds. The same also applies to the folds in other figures. The shape of the antenna structure 1 is not limited to a rectangular cuboid. Each face of the antenna structure 1 and each constituent element of the antenna structure 1 may be other than flat. The position of a connector 6 is indicated by dashed lines.

Although not illustrated, the antenna structure 1 is typically attached to an antenna mounting member 22 of a main apparatus or the like. The wiring substrate 2 and the antenna element 3 will be collectively called an antenna substrate 23.

The antenna structure 1 includes a structure surface, a plurality of structure side faces, and a structure back face. The structure surface is a face that includes a radio wave emitting face. The plurality of structure side faces are faces that are in contact with the structure surface. The structure back face is a face that is opposite to the structure surface and in contact with the plurality of structure side faces, and is also called the antenna structure 1 back face.

The wiring substrate 2 is a substrate on which electrical wiring is formed and includes the antenna element 3. In this example, the number of side faces of the wiring substrate 2 is four, but the number of side faces is not limited to four. A side face refers to a face located in a lateral direction, and refers to a face other than the radio wave emitting face and a substrate back face. The lateral direction is a direction perpendicular to an upward direction. The directions of an X axis and a Y axis are specific examples of the lateral direction. The direction of a Z axis is a specific example of the upward direction. The substrate back face is a face that is opposite to the radio wave emitting face and located in a downward direction, and is also called the wiring substrate 2 back face or the antenna substrate 23 back face. The wiring substrate 2 includes the radio wave emitting face, the substrate back face, and a plurality of substrate side faces. The substrate side faces are faces that are in contact with the radio wave emitting face. The substrate back face is a face that is in contact with the plurality of substrate side faces.

The radio wave emitting face is the face including the antenna element 3 of the wiring substrate 2. Unless otherwise stated, the antenna structure 1, the antenna substrate 23, and so on will be described assuming that the radio wave emitting face is the face located in the upward direction.

The antenna element 3 is an element with an antenna function. In this example, the number of the antenna elements 3 is nine, but the number of the antenna elements 3 is not limited to nine. The shape of the antenna element is not limited to a disc-like shape, hemisphere, or the like.

The film 4 is a single film, and is attached to at least the radio wave emitting face, the plurality of structure side faces, and an edge portion of an outer peripheral portion of the support 5 back face. The film 4 is attached so as to cover the top face, the side faces, and part of the bottom face of the antenna structure 1. The film 4 is also called a first film.

The film 4 is attached to the surface of the antenna substrate 23. Therefore, a material with low permittivity and a low-loss dissipation factor is desirable as the material of the film 4. As a specific example, the film 4 is a cycloolefin film or a polyethylene film.

The film 4 may be one that can be attached to the antenna substrate 23 and the support 5 by self-fusion of the film 4, or may be one that can be attached to the antenna substrate 23 and the support 5, using a pressure-sensitive adhesive, adhesive, or the like.

In order to reduce the influence on the antenna characteristics, it is desirable to attach the film 4 to the radio wave emitting face by self-fusion of the film.

The support 5 supports at least the outer peripheral portion of the wiring substrate 2 back face. The support 5 may support an area other than the outer peripheral portion. In this embodiment, it is assumed that the support 5 is attached so as to cover the outer peripheral portion of the wiring substrate 2 and supports the outer peripheral portion.

The antenna substrate 23 is composed of the wiring substrate 2 and the antenna element 3 and is fixed to the support 5.

The antenna structure 1 is formed by attaching the film 4 from the radio wave emitting face of the antenna substrate 23 so as to wrap the side faces of the antenna substrate 23 to the outer peripheral portion of the support 5 back face. That is, the film 4 is attached so as to cover the entire face of the radio wave emitting face of the antenna substrate 23, the entire faces of all the side faces of the antenna substrate 23, and the edge portion of the outer peripheral portion of the support 5 back face, and the film 4 does not have any separated portions.

Figure 2:
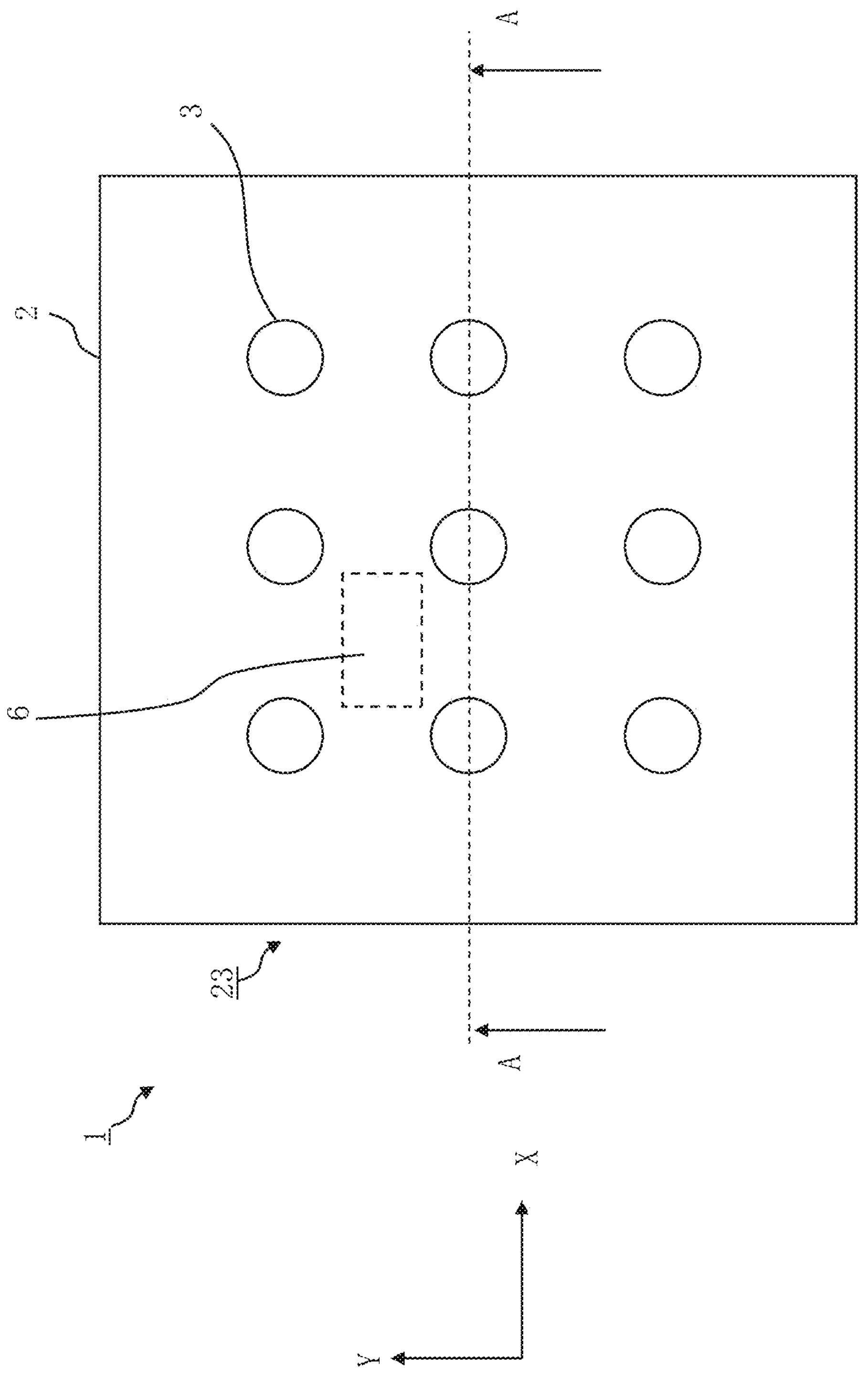
FIG. 2 is a top view diagram of the antenna structure 1 according to Embodiment 1.

FIG. 2 illustrates a specific example of a top view diagram of the antenna structure 1 according to this embodiment. A top view diagram is a diagram illustrating a plan view of an object as viewed from above, and is also called a top view. This figure is also a plan view diagram of the radio wave emitting face and a top view diagram of the antenna substrate 23. As illustrated in this figure, when the antenna structure 1 is viewed from above, the wiring substrate 2 and the antenna element 3 are visible. The position of the connector 6 is indicated by dashed lines.

In practice, the film 4 is attached to the entire face of the radio wave emitting face. Note that the entire face means the whole surface of a face. However, for convenience of description, the film 4 is omitted in this diagram.

Figure 3:
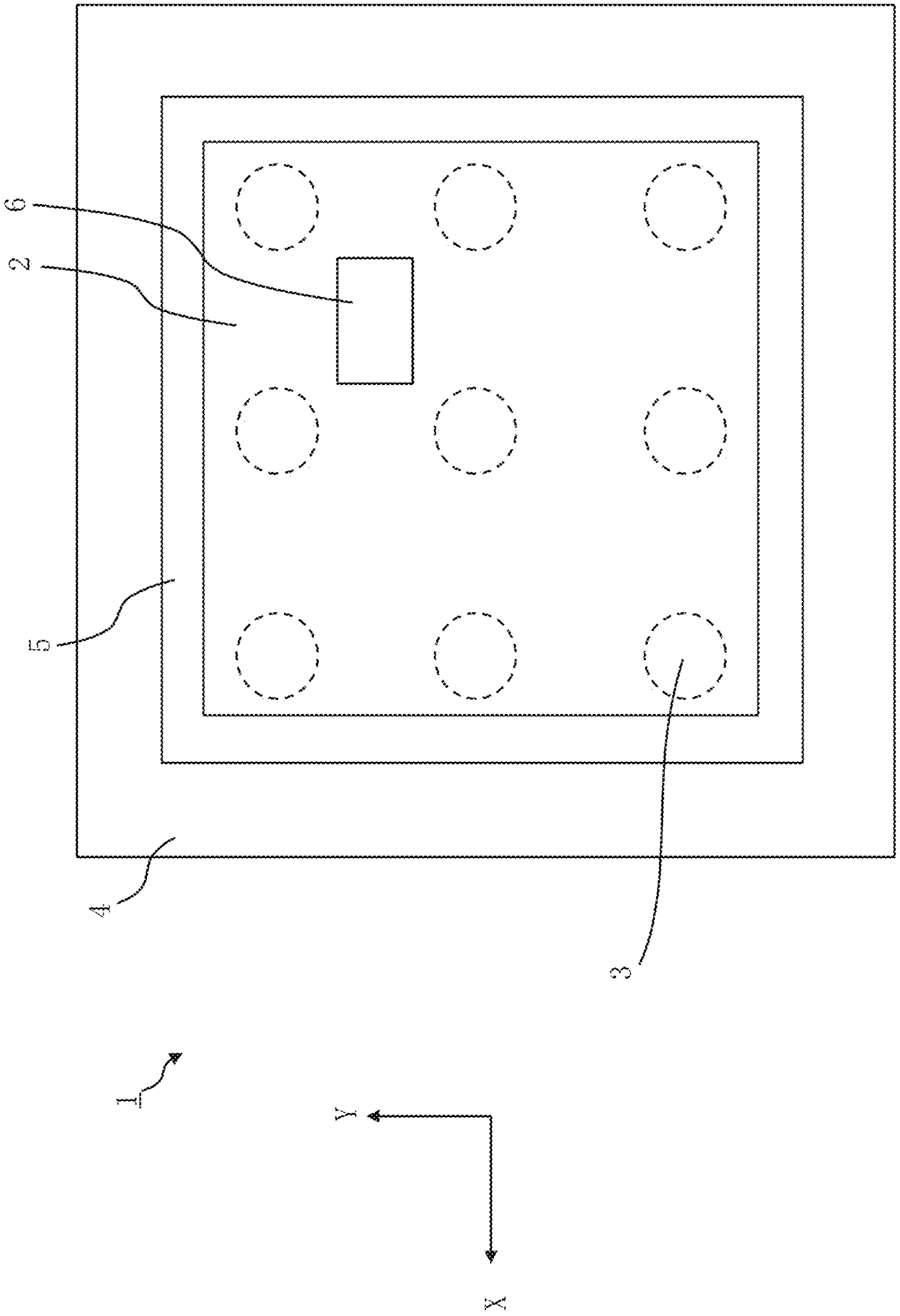
FIG. 3 is a bottom view diagram of the antenna structure 1 according to Embodiment 1.

FIG. 3 illustrates a specific example of a bottom view diagram of the antenna structure 1 according to this embodiment. A bottom view diagram is a diagram illustrating a plan view of an object as viewed from below, and is also called a bottom view. As illustrated in this figure, when the antenna structure 1 is viewed from below, the wiring substrate 2 back face, the film 4, the support 5 back face, and the connector 6 are visible. The support 5 back face is behind the film 4. The position of the antenna element 3 is indicated by dashed lines.

The support 5 supports only the outer peripheral portion of the wiring substrate 2. Therefore, there is an opening portion of the support 5, that is, an area where the support 5 does not exist in the antenna structure 1 back face.

The film 4 is attached only to the edge portion of the support 5 back face, so that there is an opening portion of the film 4, that is, an area where the film 4 does not exist in the antenna structure 1 back face. The film 4 may be attached to the entire face of the support 5 back face, or may wrap the support 5 back face and be attached to the inner wall of the support 5.

The connector 6 is placed on the antenna substrate 23 back face, and electrically connects the antenna substrate 23 and the antenna mounting member 22 or the like.

Figure 4:
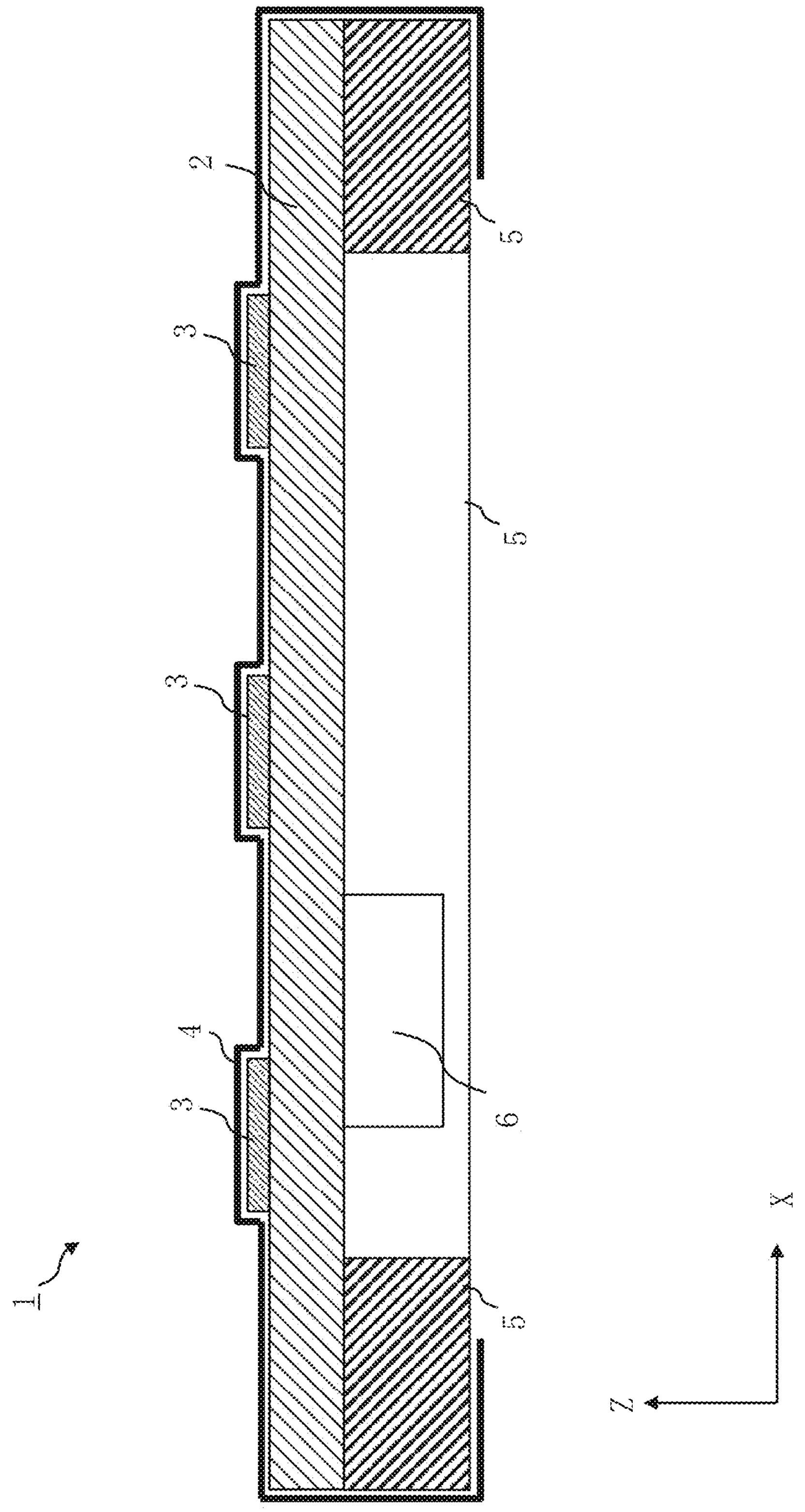
FIG. 4 is a side cross-sectional diagram of the antenna structure 1 according to Embodiment 1.

FIG. 4 illustrates a specific example of a side cross-sectional diagram of the antenna structure 1 according to this embodiment. A side cross-sectional diagram is a plan view of a cross section perpendicular to the lateral direction, and is also called a side cross-sectional view. This figure illustrates an AA cross section indicated in FIG. 2. In the AA cross section, as illustrated in this figure, cross sections of the wiring substrate 2, the antenna elements 3, the film 4, and the outer peripheral portion of the support 5 are visible. On the support 5 back face, the film 4 is attached to the edge portion of the outer peripheral portion. In the back of the AA cross section, a face that is a side face, facing the AA cross section, of the connector 6 and an inner wall, facing the AA cross section, of the opening portion of the support 5 are visible. In the following, unless otherwise stated, a side cross-sectional diagram is a diagram illustrating the AA cross section or a cross section at a position corresponding to the AA cross section.

In this figure, there seems to be a gap between the film 4 and each of the wiring substrate 2, the antenna element 3, and the support 5. However, the gap is for clearly indicating the film 4, and there is actually no such gap. The same as in this figure also applies to other side cross-sectional diagrams. There may be a slight gap between the film 4 and a boundary between the wiring substrate 2 and the antenna element 3 or the like.

In order to waterproof the opening portion of the support 5, a gap between the opening portion or an area around the opening portion of the support 5 and the antenna mounting member 22 is filled. Specific examples of waterproofing the opening portion of the support 5 will be presented below.

Figure 5:
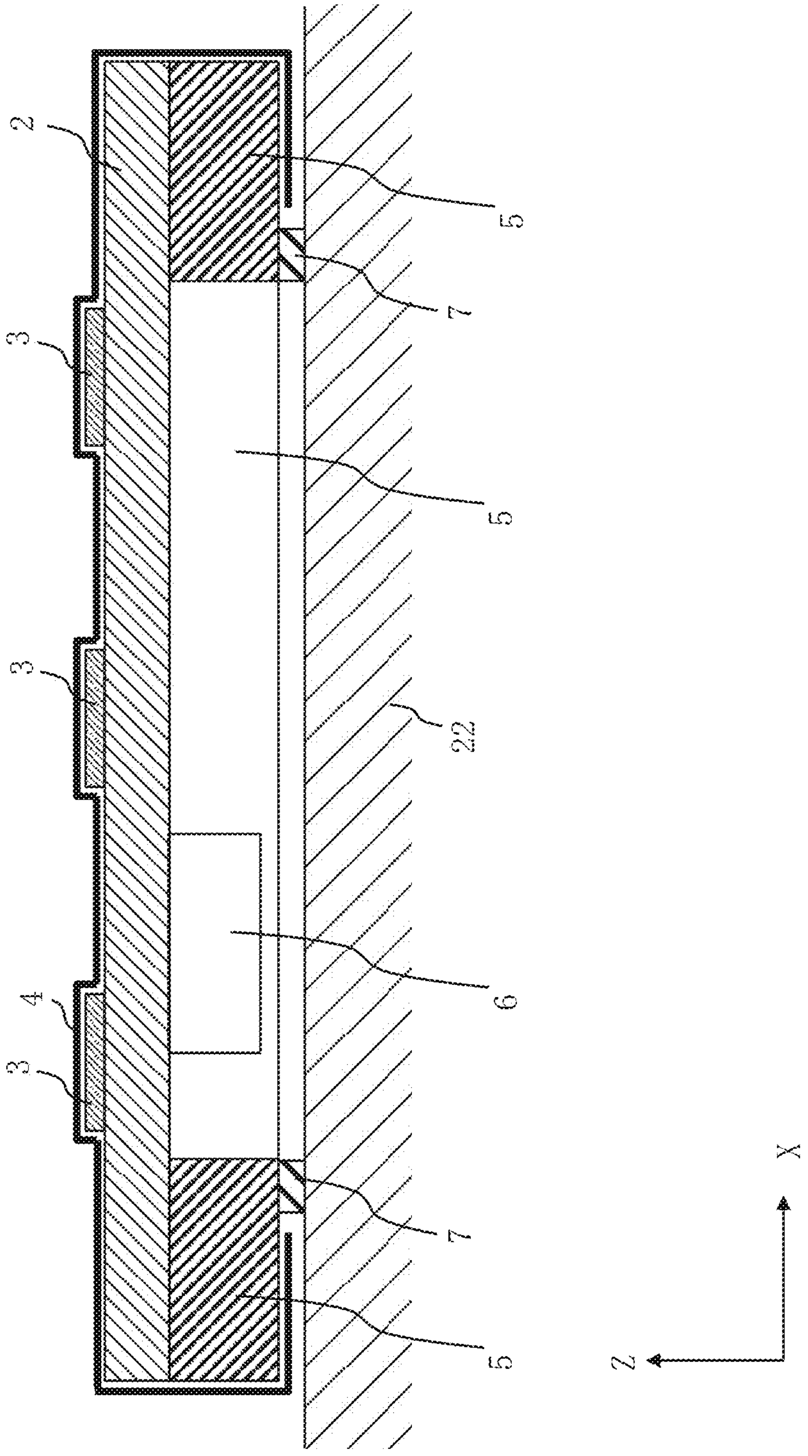
FIG. 5 is a side cross-sectional diagram of the antenna structure 1 and an antenna mounting member 22 according to Embodiment 1.

FIG. 5 illustrates a specific example of a side cross-sectional diagram of the antenna structure 1 and the antenna mounting member 22 according to this embodiment. In this example, the antenna structure 1 is attached to the antenna mounting member 22 so that the antenna structure 1 back face faces a flat area of the antenna mounting member 22.

This figure illustrates an example in which the opening portion of the support 5 is waterproofed by placing packing 7 in the entire area of a surrounding area of the peripheral portion of the opening portion of the support 5, where this area is between the support 5 back face and the antenna mounting member 22, so as to cause the antenna structure 1 and the antenna mounting member 22 to be in close contact.

Figure 6:
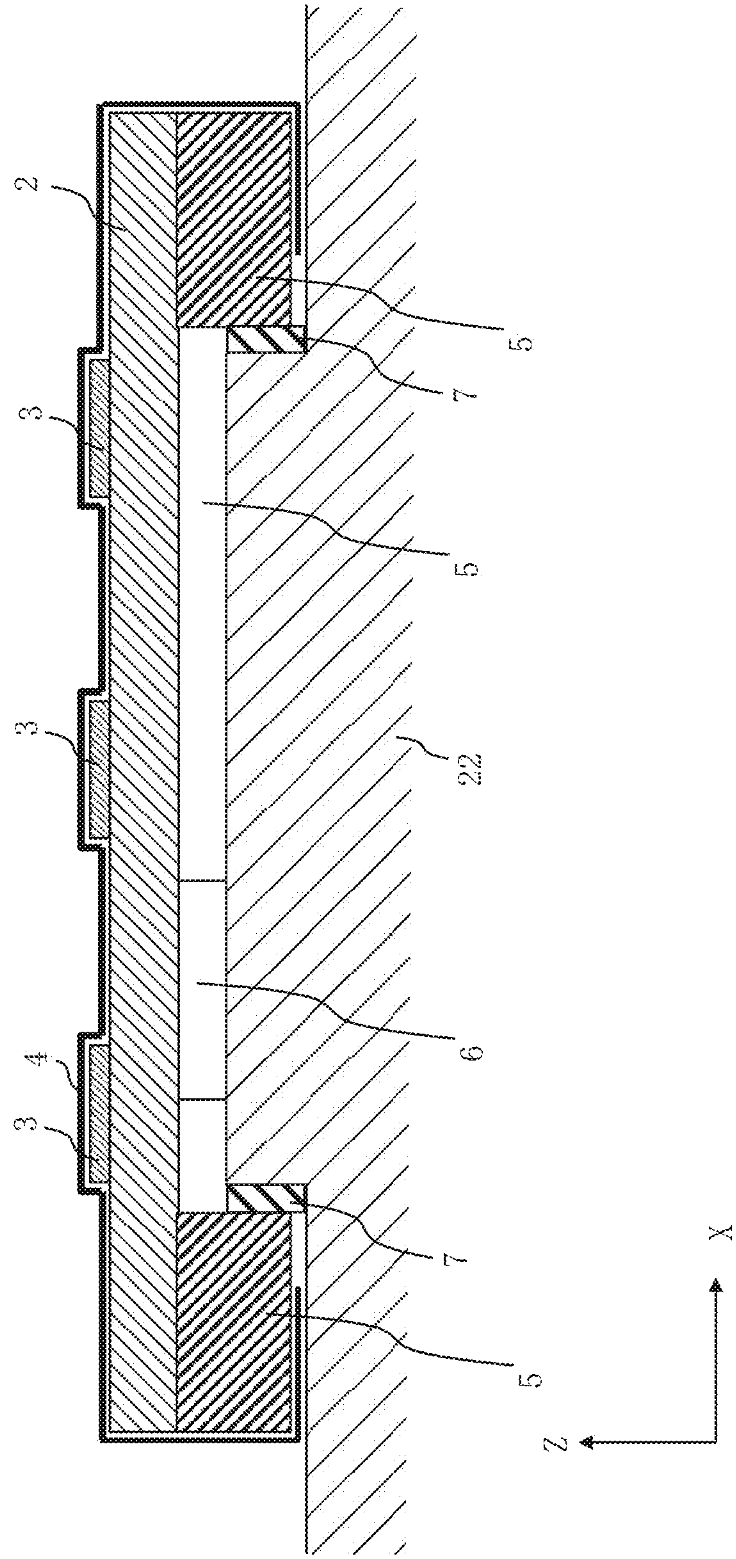
FIG. 6 is a side cross-sectional diagram of the antenna structure 1 and the antenna mounting member 22 according to Embodiment 1.

FIG. 6 illustrates a specific example of a side cross-sectional diagram of the antenna structure 1 and the antenna mounting member 22 according to this embodiment. In this example, the antenna mounting member 22 has a protruding portion that can be contained in the opening portion of the support 5, and the opening portion of the support covers the protruding portion. The inner walls of the opening portion of the support 5 and the side faces of the protruding portion are not in contact.

This figure illustrates an example of waterproofing the opening portion of the support 5 by placing the packing 7 between the inner walls of the opening portion of the support 5 and the side faces of the protruding portion of the antenna mounting member 22 so as to cause the antenna structure 1 and the antenna mounting member 22 to be in close contact.

In addition to the above examples, filling the entire opening portion of the support 5 with resin, or attaching a lid to the opening portion of the support 5 may be pointed out as means for waterproofing the opening portion of the support 5.

Description of Operation

A film attachment process according to this embodiment will be described below. The film attachment process is a series of steps to attach the film 4 to the antenna structure 1 to which the film 4 has not been attached.

In the film attachment process, as a specific example, a forming method using an apparatus that utilizes gas pressure to attach a skin material to the surface of an attachment target 12 is used. An antenna production method is a method for producing the antenna substrate 23 or the antenna structure 1 using the apparatus. As a specific example of the apparatus, a three-dimensional surface decoration forming machine may be pointed out. The film attachment process using the three-dimensional surface decoration forming machine will be described below.

Figure 7:
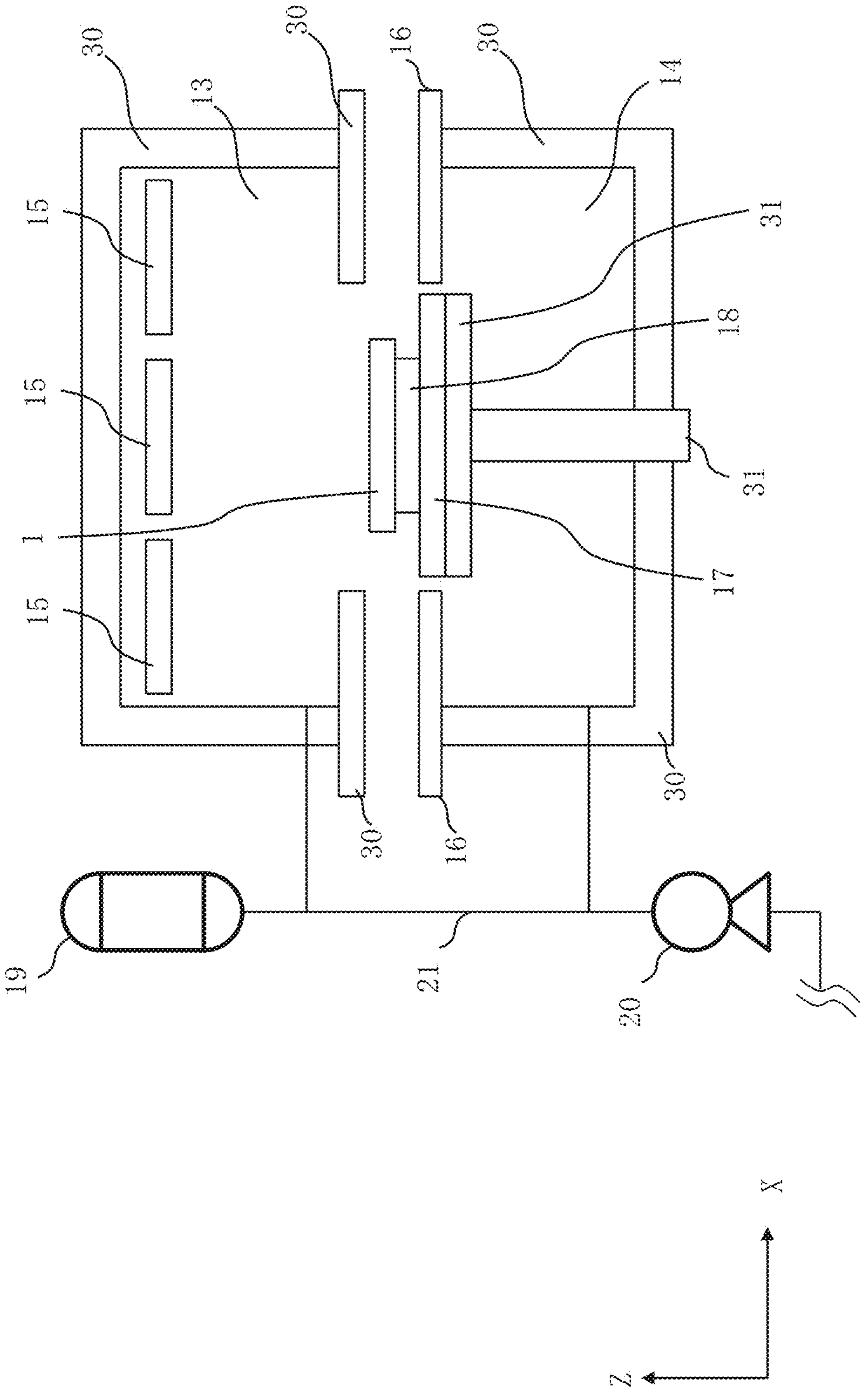
FIG. 7 is a schematic diagram of a three-dimensional surface decoration forming machine.

FIG. 7 illustrates a schematic of the three-dimensional surface decoration forming machine. On the right side, a schematic of the attachment target 12 and an area where the attachment target 12 is stored is illustrated. The three-dimensional surface decoration forming machine is mainly composed of an upper chamber 13, a lower chamber 14, a heater 15, a frame 16, a stage 17, a film forming jig 18, a compressor 19, a vacuum pump 20, a pipe 21, a machine housing 30, and an elevating section 31. Part of each of the upper chamber 13 and the lower chamber 14 is covered by the machine housing 30 of the three-dimensional surface decoration forming machine. The heater 15 is installed inside the upper chamber 13 and heats the film 4. The heater 15 may include a plurality of heating sections, and three of the heating sections are illustrated in this figure. The frame 16 is attached to a cross section of the three-dimensional surface decoration forming machine at a position near the boundary between the upper chamber 13 and the lower chamber 14. A film is placed in the space surrounded by the frame 16 inside the three-dimensional surface decoration forming machine. The film forming jig 18 is placed on the stage 17. The attachment target 12 is placed on the film forming jig 18. The attachment target 12 is a target to which the three-dimensional surface decoration forming machine attaches a film. In the present disclosure, the attachment target 12 is the antenna structure 1 or the antenna substrate 23 to which at least one of the films to be attached has not been attached. The compressor 19 and the vacuum pump 20 adjust the pressure in the upper chamber 13 and the pressure in the lower chamber 14. The pipe 21 connects the upper chamber 13, the lower chamber 14, the compressor 19, and the vacuum pump 20. The machine housing 30 is the housing of the three-dimensional surface decoration forming machine, and includes the upper chamber 13 and the lower chamber 14 inside. The elevating section 31 is composed of a seat on which the stage 17 is mounted and a leg to support the seat and to raise and lower the seat.

The film forming jig 18 is placed on the stage 17, and the antenna structure 1 to which the film has not been attached is placed on the film forming jig 18.

The outer shape of the top face of the film forming jig 18 is smaller than the outer shape of the antenna substrate 23 or the antenna structure 1 back face to which the film has not been attached. That is, the outer shape of the top face of the film forming jig 18 is contained within the outer shape of the bottom face of the antenna substrate 23 or the antenna structure 1. The antenna structure 1 can be placed on the top face of the film forming jig 18 with the radio wave emitting face facing upward so that at least the entire edge portion of the outer peripheral portion of the antenna structure 1 back face is not in contact with the top face of the film forming jig 18. With this arrangement, when the film 4 is attached to the antenna structure 1, the film 4 can be wrapped to the side faces of the film forming jig 18. After the film 4 is wrapped to the side faces of the film forming jig 18, the film 4 is trimmed along the boundary of the side faces of the film forming jig 18 and the antenna structure 1. As a result, the antenna structure 1 to which the film 4 has been attached, as illustrated in FIGS. 1 to 4 and so on, can be produced.

Figure 8:
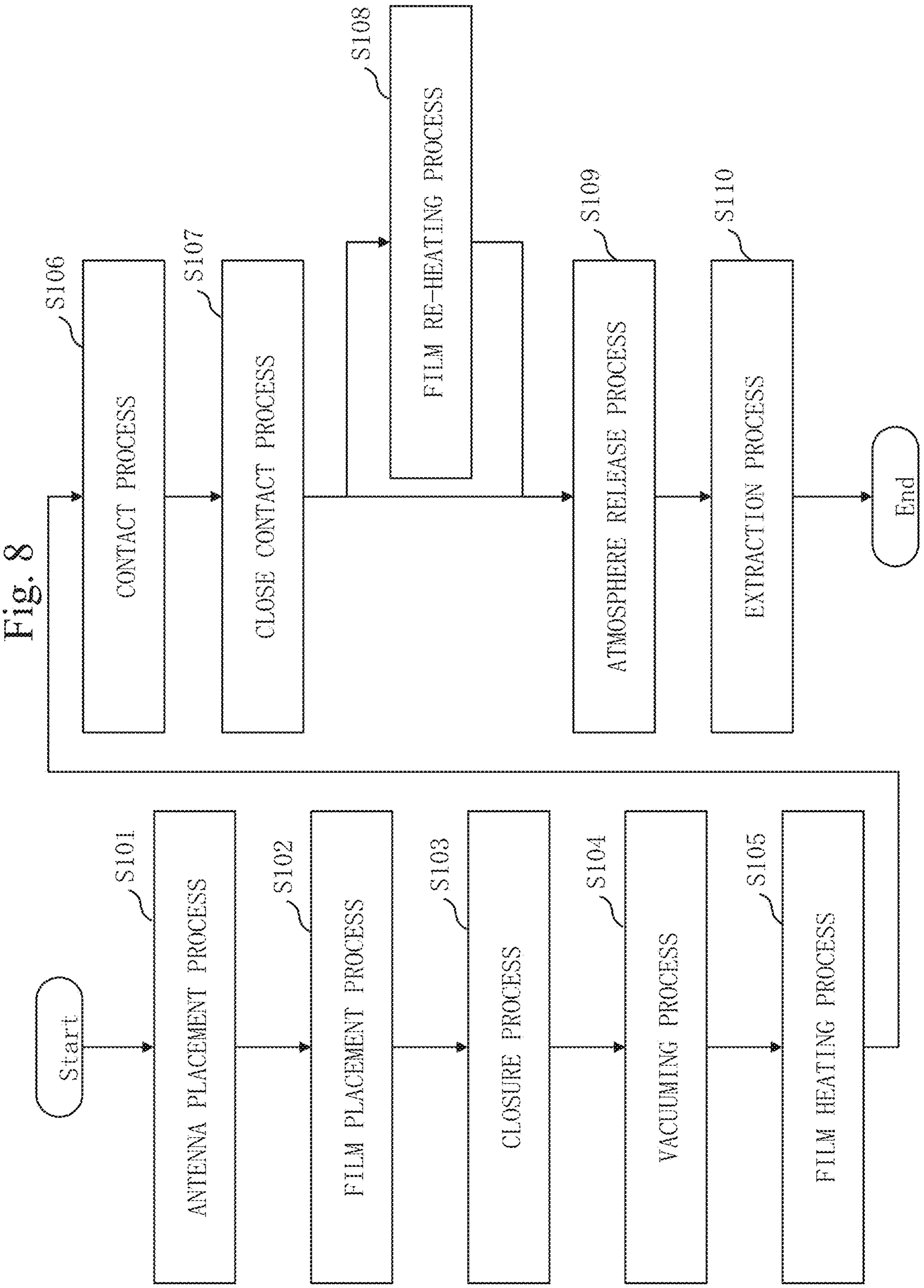
FIG. 8 is a flowchart illustrating a film attachment process according to Embodiment 1.

FIG. 8 is a flowchart illustrating an example of the film attachment process. Using this figure, the film attachment process will be described below. Note that the film 4 is not attached to the antenna structure 1 until halfway through the process indicated in this flowchart. The antenna structure 1 to which at least one of the films to be attached has not been attached may be simply called the antenna structure 1. A specific example of the films to be attached is the film 4.

(Step S101: Antenna Placement Process)

The film forming jig 18 is placed on the stage 17, and the antenna structure 1, which is the attachment target 12, is placed on the film forming jig 18.

Then, the three-dimensional surface decoration forming machine lowers the stage 17 so that the entirety of the antenna structure 1 is contained within the lower chamber 14.

Figure 9:
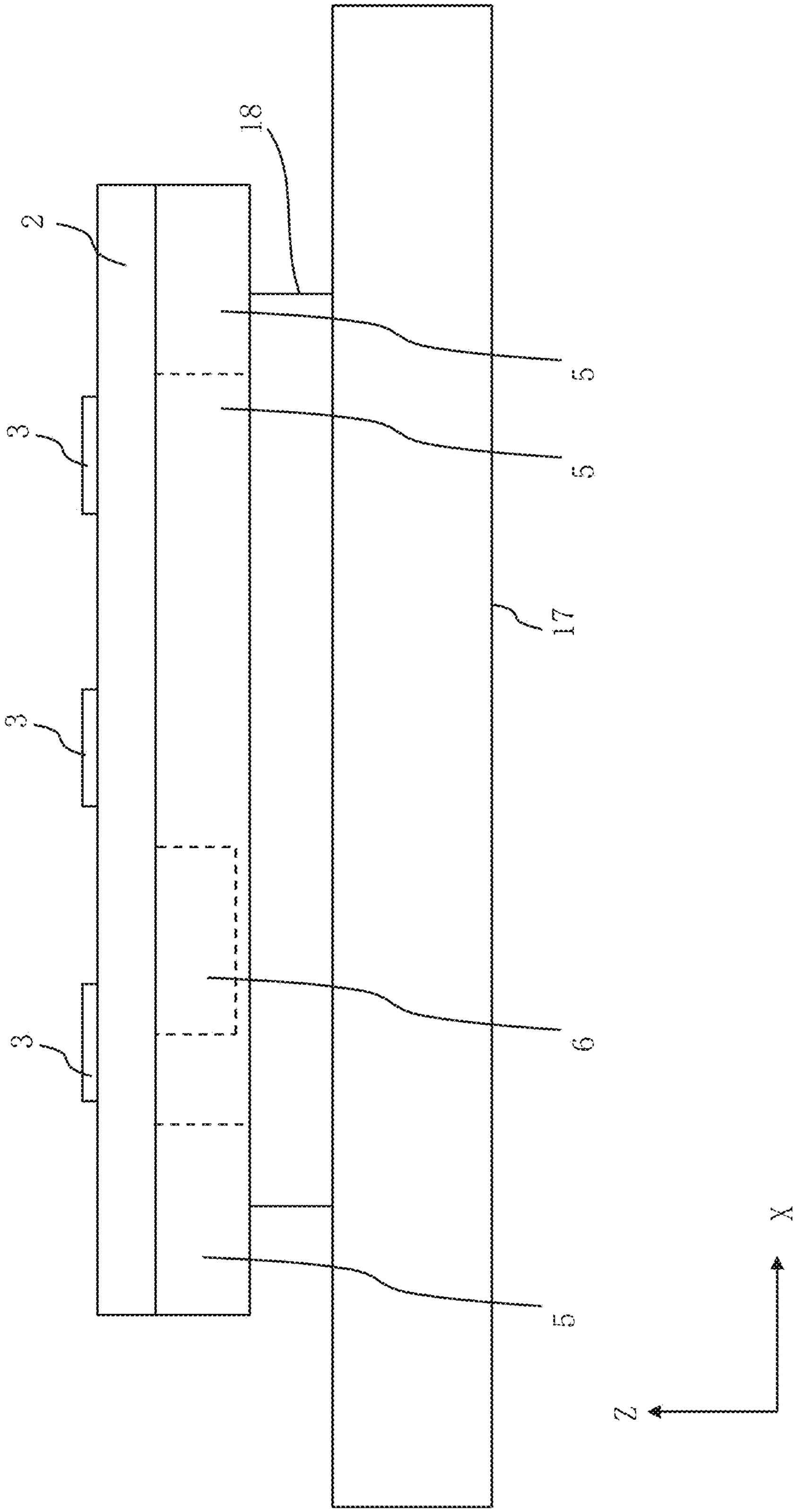
FIG. 9 is a diagram illustrating a state in which the antenna structure 1 is placed in the three-dimensional surface decoration forming machine.

FIG. 9 illustrates a specific example of a state in which the film forming jig 18 is placed on the stage 17 and the antenna structure 1 is placed on the film forming jig 18. In this figure, the positions of the outer peripheral portion of the support 5 and the connector 6 are indicated by dashed lines, and a state is illustrated in which the edge portion of the outer peripheral portion of the support 5 back face protrudes from the film forming jig 18.

(Step S102: Film Placement Process)

The film 4 is placed so as to block the entire area of a hole formed by the frame 16. The hole is a space surrounded by the frame 16.

Figure 10:
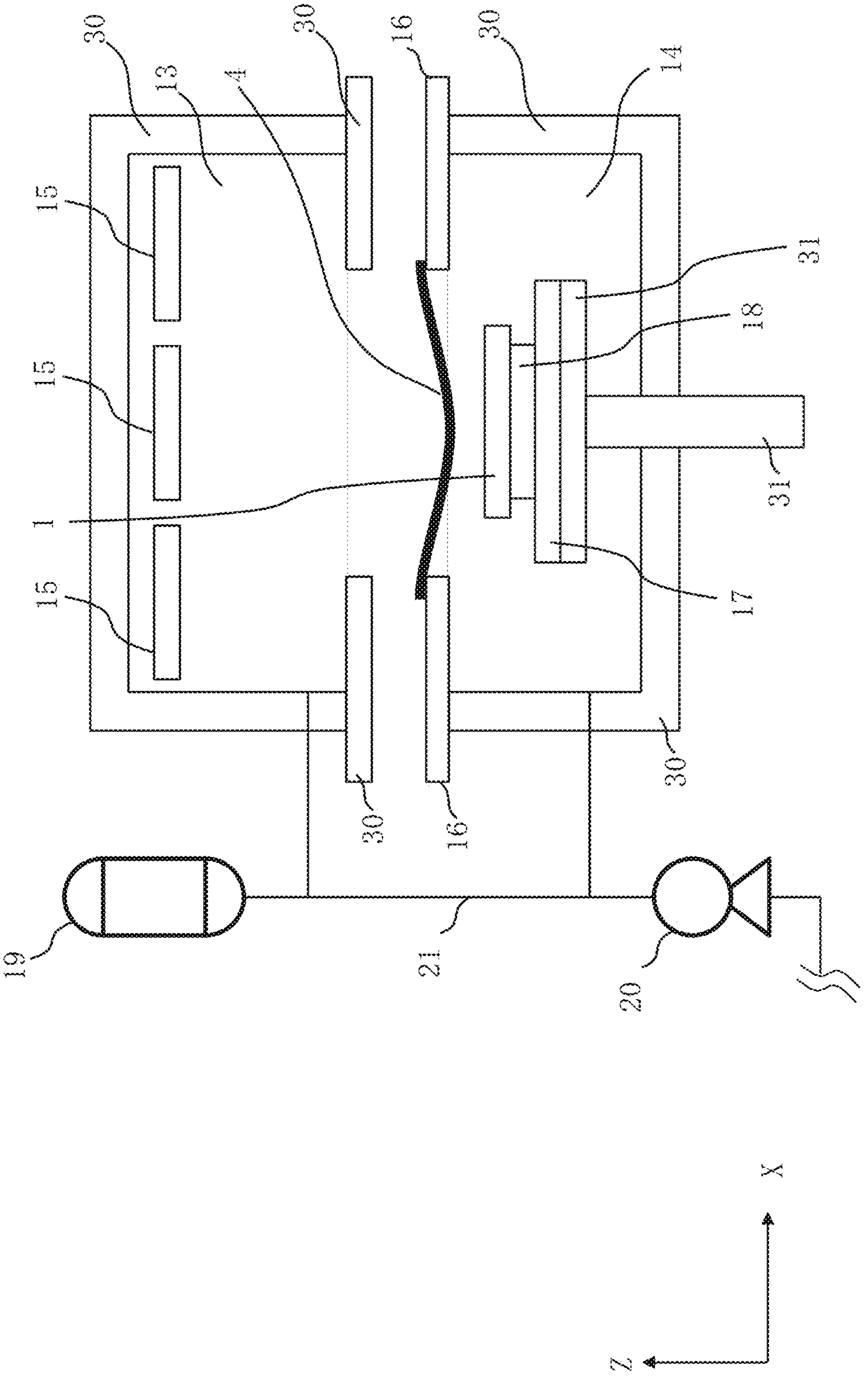
FIG. 10 is a diagram illustrating a film attachment method using the three-dimensional surface decoration forming machine.

FIG. 10 illustrates a specific example of a state in which the film 4 is placed on the frame 16. In the three-dimensional surface decoration forming machine, a single film is provided as a skin material. The antenna structure 1 is placed under the film 4, and the entirety of the antenna structure 1 is contained within the lower chamber 14. In this figure, the antenna structure 1 is placed so that a face that is opposite to the face including the radio wave emitting face is in contact with the top face of the film forming jig 18 placed under the film 4.

(Step S103: Closure Process)

The three-dimensional surface decoration forming machine closes the upper chamber 13 and the lower chamber 14. As a result, the space on the side of the upper chamber 13 and the space on the side of the lower chamber 14 are separated with the frame 16 and the film 4 as a boundary.

Figure 11:
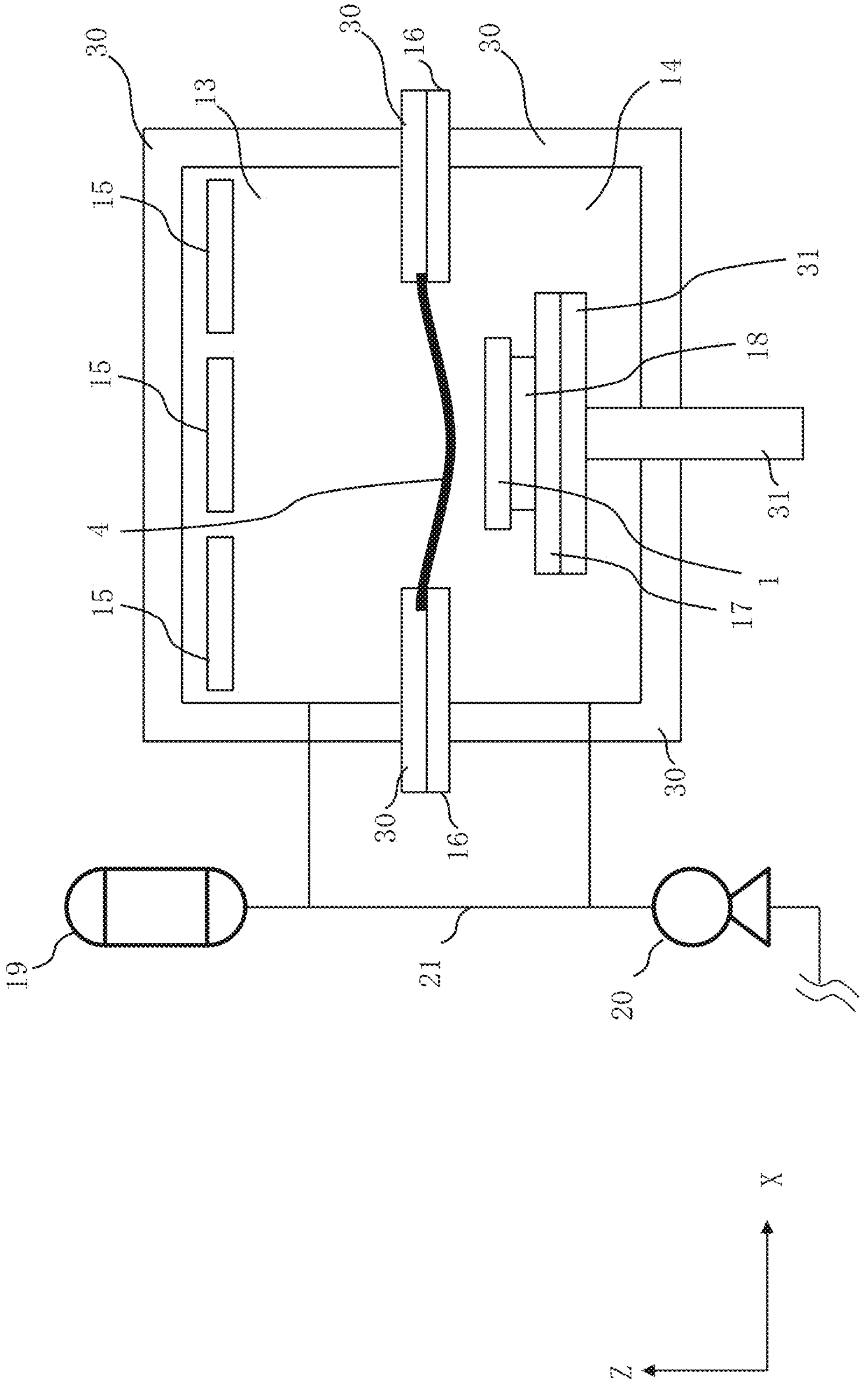
FIG. 11 is a diagram illustrating the film attachment method using the three-dimensional surface decoration forming machine.

FIG. 11 illustrates a specific example of a state in which the upper chamber 13 and the lower chamber 14 of the three-dimensional surface decoration forming machine are closed. The frame 16 and the film 4 are the boundary between the space in the upper chamber 13 and the space in the lower chamber 14.

(Step S104: Vacuuming Process)

The three-dimensional surface decoration forming machine uses the vacuum pump 20 to pull air from the upper chamber 13 and the lower chamber 14.

(Step S105: Film Heating Process)

The heater 15 heats the film 4. When the film 4 reaches a temperature that allows forming, the three-dimensional surface decoration forming machine proceeds to the next step.

(Step S106: Contact Process)

The three-dimensional surface decoration forming machine causes the attachment target 12 to be in contact with the film 4. That is, the three-dimensional surface decoration forming machine raises the stage 17 to press the antenna structure 1 against the film 4.

Figure 12:
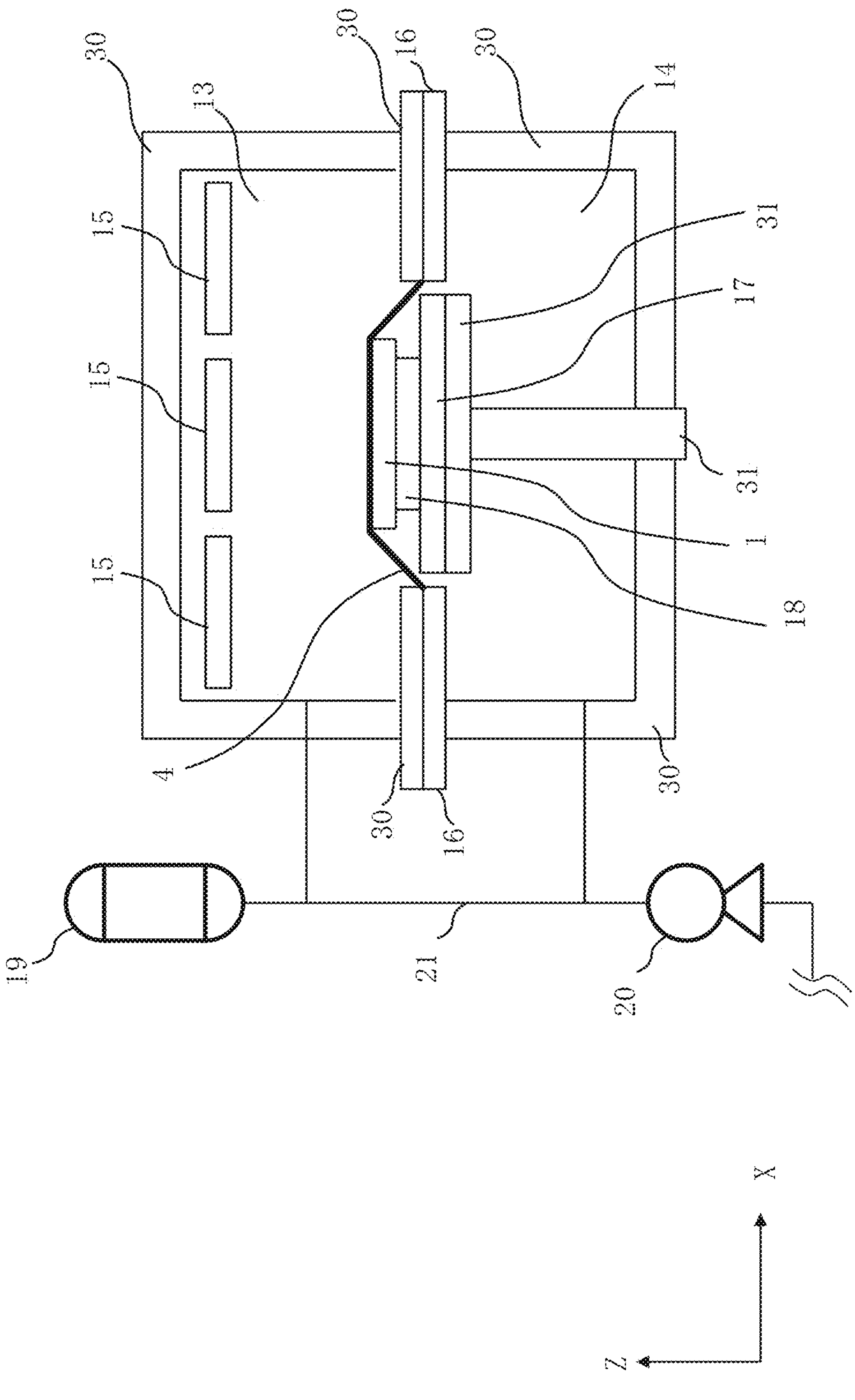
FIG. 12 is a diagram illustrating the film attachment method using the three-dimensional surface decoration forming machine.

FIG. 12 illustrates a specific example of a state in which the three-dimensional surface decoration forming machine has raised the stage 17 to press the antenna structure 1 against the film 4.

(Step S107: Close Contact Process)

The three-dimensional surface decoration forming machine uses the compressor 19 to inject compressed air only into the upper chamber 13 so as to pressurize the upper chamber 13. While compressed air is injected into the space in the upper chamber 13, the space in the lower chamber 14 is maintained in a vacuum state. Therefore, the film 4 is attached around the antenna structure 1 without any gap. In this step, the three-dimensional surface decoration forming machine attaches the film 4 to the surface of the antenna structure 1 by causing the pressure under the film 4 to be lower than the pressure above the film 4. With this process, the film 4 that is suitably fitted to pits and projections on the substrate and the shape of the substrate can be attached to the attachment target 12.

Figure 13:
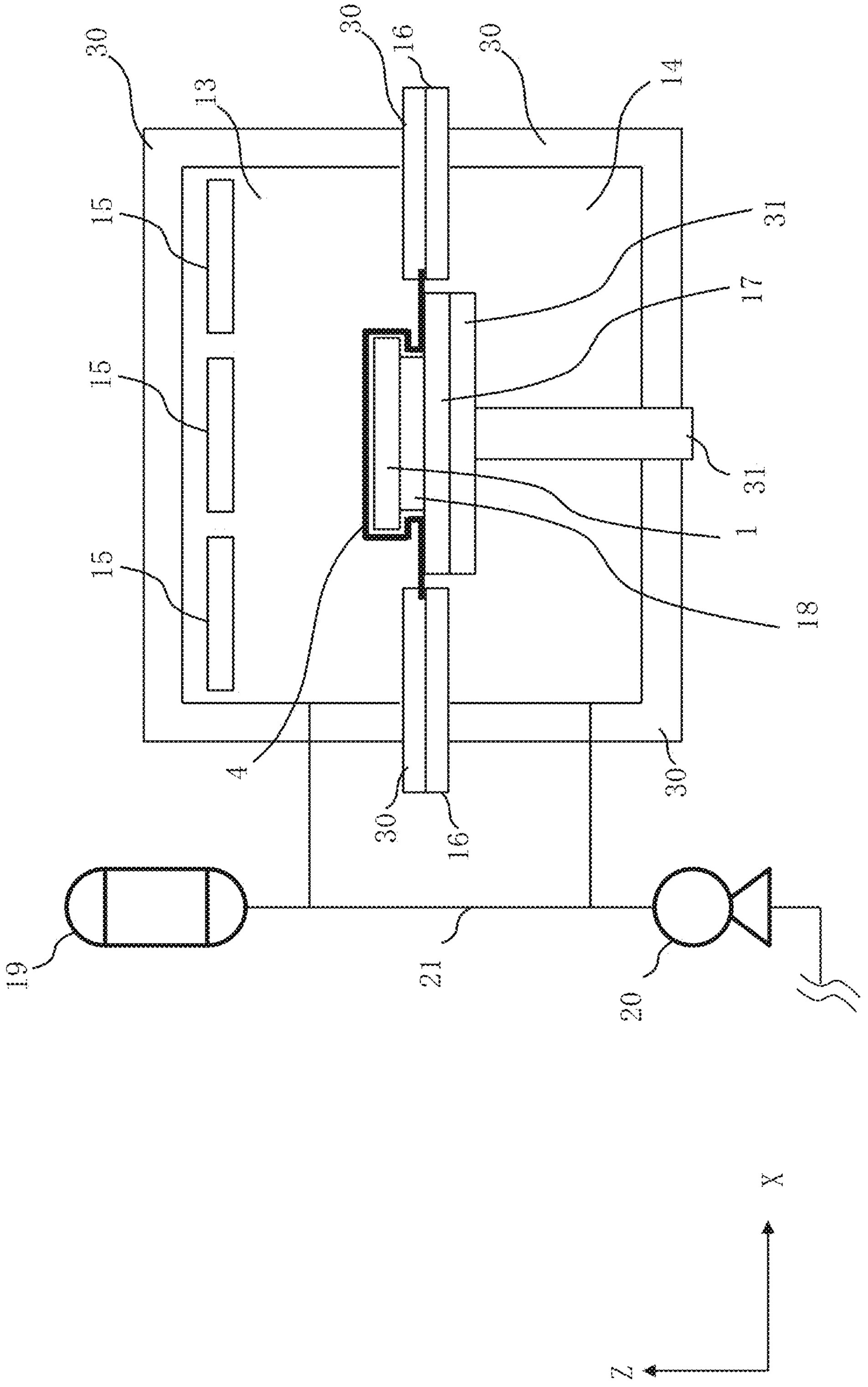
FIG. 13 is a diagram illustrating the film attachment method using the three-dimensional surface decoration forming machine.

FIG. 13 illustrates a state after pressured air is injected. The film 4 is in close contact with the periphery of the antenna structure 1 due to a difference between the pressure in the upper chamber 13 and the pressure in the lower chamber 14.

Figure 14:
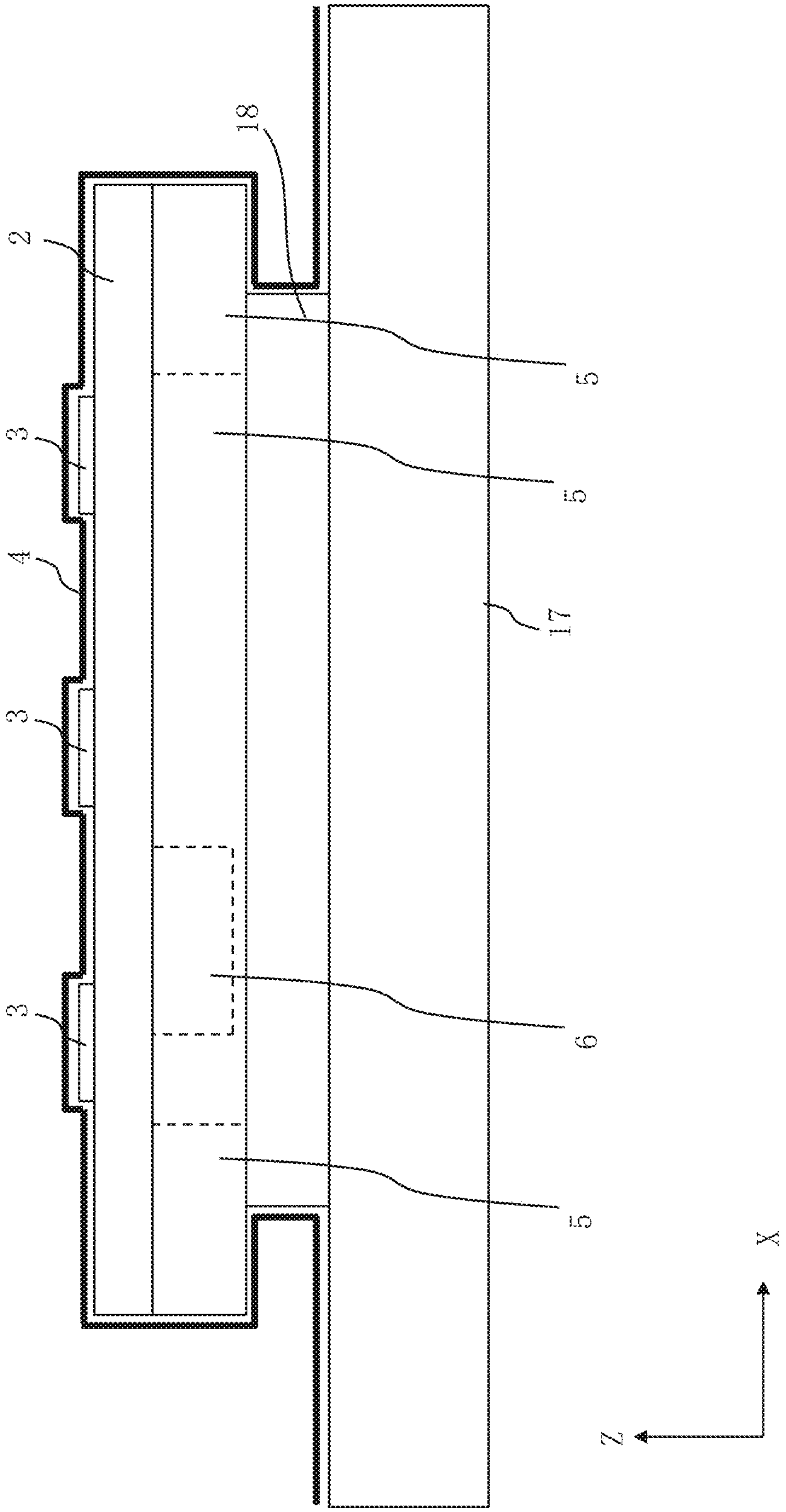
FIG. 14 is a diagram illustrating a state in which a film 4 is caused to be in close contact with the surface of the antenna structure 1, using the three-dimensional surface decoration forming machine.

FIG. 14 illustrates a state of forming the film 4 on the stage 17 after compressed air is injected into the upper chamber 13. This figure is also a side view diagram of the antenna structure 1, the stage 17, and the film forming jig 18. The film 4 is in close contact with the surface, facing the space in the upper chamber, of each of the wiring substrate 2, the antenna element 3, the support 5, and the film forming jig 18. The film 4 is in close contact with the edge portion of the outer peripheral portion of the support back face.

(Step S108: Film Re-Heating Process)

The three-dimensional surface decoration forming machine may choose whether or not to carry out this step.

The three-dimensional surface decoration forming machine re-heats the film 4 with the heater 15. By this step, adhesion between the film 4 and the antenna structure 1 can be improved.

(Step S109: Atmosphere Release Process)

The three-dimensional surface decoration forming machine restores the air pressure in both of the space inside the upper chamber 13 and the space in the lower chamber 14 to atmospheric pressure.

(Step S110: Extraction Process)

The antenna structure 1 is extracted from the three-dimensional surface decoration forming machine.

The film 4 may be trimmed before the antenna structure 1 is extracted from the three-dimensional surface decoration forming machine, or may be trimmed using another machine or the like after the antenna structure 1 is extracted.

Description of Effects of Embodiment 1

The film 4 is attached to the antenna structure 1 as described above, so that waterproofness is secured on the radio wave emitting face and all the side faces of the antenna substrate 23 and between the antenna substrate 23 and the support 5.

The film 4 is attached to the antenna structure 1 as described above, so that the film that is wrapped from the side faces of the antenna substrate 23 to the edge portion of the outer peripheral portion of the support 5 back face acts as an anchor. This reduces a risk that the film 4 will peel off due to deformation caused by thermal expansion of at least one of the wiring substrate 2 and the support 5, deformation caused by a difference in thermal expansion between the wiring substrate 2 and the support 5, or the like.

The film 4 is wrapped from the side faces of the antenna substrate 23 to the edge portion of the outer peripheral portion of the support 5 back face, so that a waterproof distance can be lengthened, resulting in enhanced waterproofness. The waterproof distance is the shortest distance from the end of a member for waterproofing to an area that needs to be waterproofed. In the antenna structure 1, the member for waterproofing is the film 4, the packing 7, or the like, and the area that needs to be waterproofed is an exposed portion of the antenna substrate 23 or the like. The waterproof distance in this embodiment is the distance from the end of the film 4 in the support 5 back face to the bottom edge of each of the side faces of the antenna substrate 23.

When the film is attached by self-bonding of the film or an adhesive, generally if the film peels off after the film has been attached once, the adhesiveness of the film is not maintained, and it is difficult to restore the adhesiveness of the film without a process such as re-heating the film. Therefore, self-bonding of the film or an adhesive leads to a higher risk that the film will peel off when compared with a pressure-sensitive adhesive.

However, according to this embodiment, since the film 4 is wrapped to the support 5 back face and the film 4 shrinks when the film 4 is attached, and also due to effects caused by these, the adhesion of the film 4 to the antenna substrate 23 and the support 5 is enhanced, and a risk that the film 4 will peel off from the antenna substrate 23 and the support 5 is reduced.

Even when self-bonding of the film is used, a risk that the film 4 will peel off from the antenna substrate 23 and the support 5 is reduced because the film 4 is arranged to be wrapped to the support 5 back face.

Other Configurations

<Variation 1>

Figure 15:
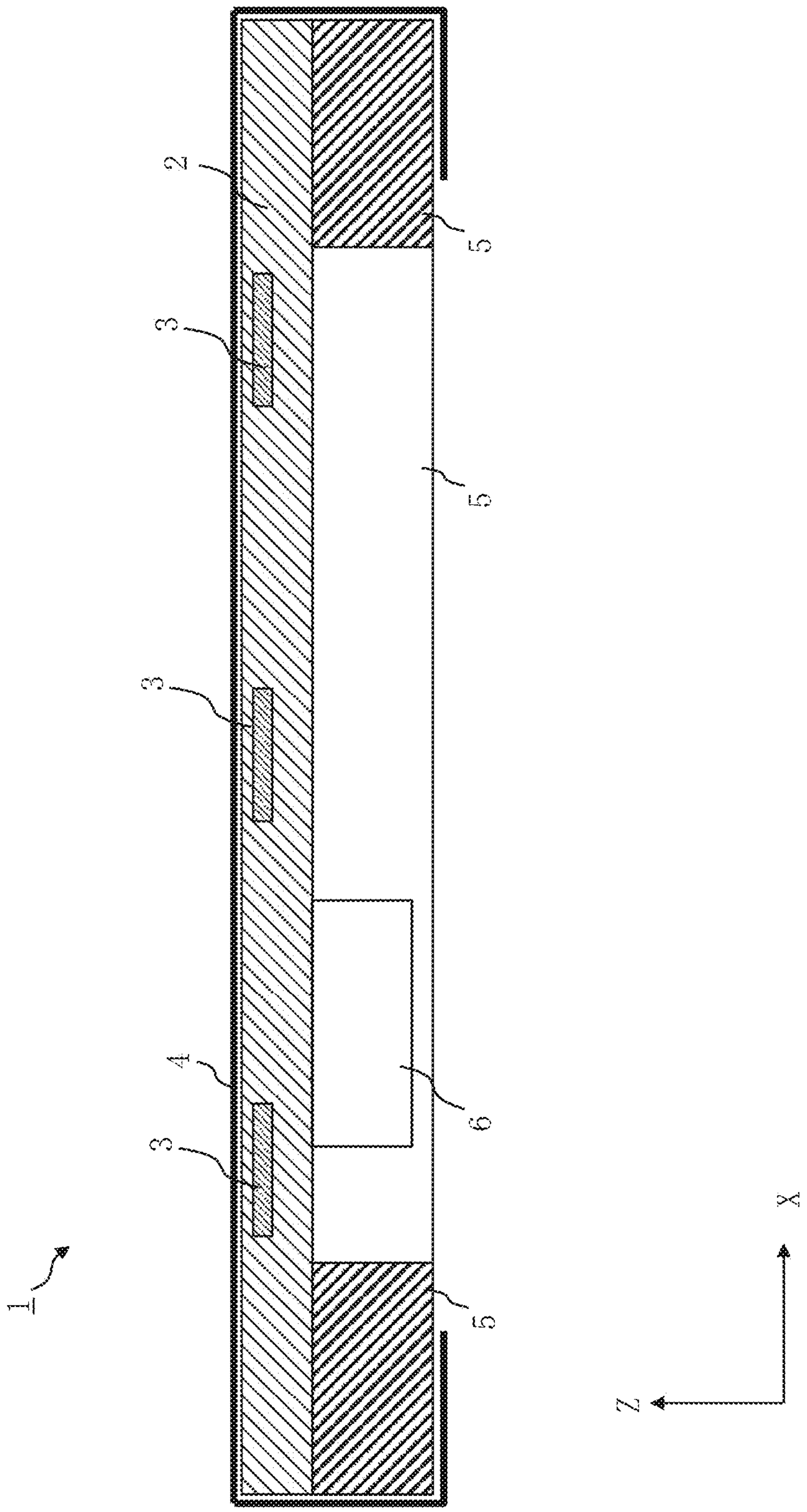
FIG. 15 is a side cross-sectional diagram of the antenna structure 1 according to Embodiment 1.

FIG. 15 illustrates a specific example of a side cross-sectional diagram of the antenna structure 1 according to this variation. In this variation, the antenna elements 3 are placed inside the wiring substrate 2 so as not to protrude from the top face of the wiring substrate 2. The radio wave emitting face in this variation is the face corresponding to the radio wave emitting face in FIG. 4 and so on. The face including the antenna elements 3 is also the face intended to perform at least one of transmission and reception of radio waves.

Part of each of the antenna elements 3 may be placed inside the wiring substrate 2, or part of the antenna elements 3 may be placed inside the wiring substrate 2.

<Variation 2>

Figure 16:
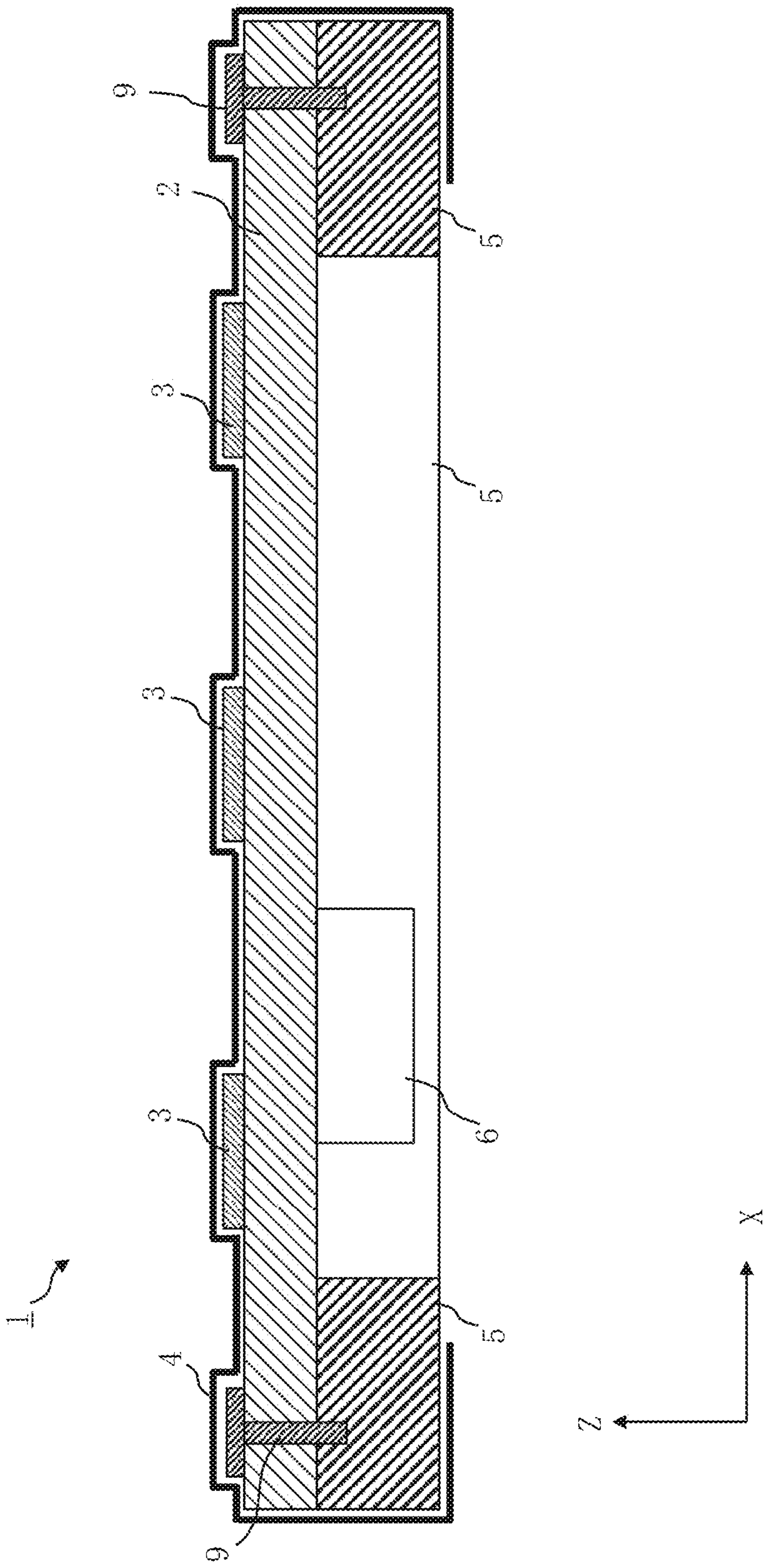
FIG. 16 is a side cross-sectional diagram of the antenna structure 1 according to Embodiment 1.

FIG. 16 illustrates a specific example of a side cross-sectional diagram of the antenna structure 1 according to this variation. In this figure, cross sections of screws 9 are visible in addition to those illustrated in FIG. 4. In this variation, the antenna substrate 23 and the support 5 are fastened and fixed by inserting and installing the screws 9 from the top face side of the antenna substrate 23. There may be any number of the screws 9 at any positions, and the screws 9 may be installed without crossing the AA cross section.

A method for producing the antenna structure 1 illustrated in this figure will be briefly described. Before the film 4 is attached to the antenna structure 1, the screws 9 are inserted and installed from the top face side of the antenna substrate 23 to fasten the antenna substrate 23 to the support 5. Then, the film 4 is attached from the top faces and side faces of the screws 9 and the entire face of the radio wave emitting face so as to wrap the side faces of the antenna substrate 23 to the edge portion of the outer peripheral portion of the support 5 back face.

In this case, the fastening sections of the screws 9 are waterproofed by the film 4. Therefore, it is not necessary to waterproof these fastening sections using a different method.

<Variation 3>

Figure 17:
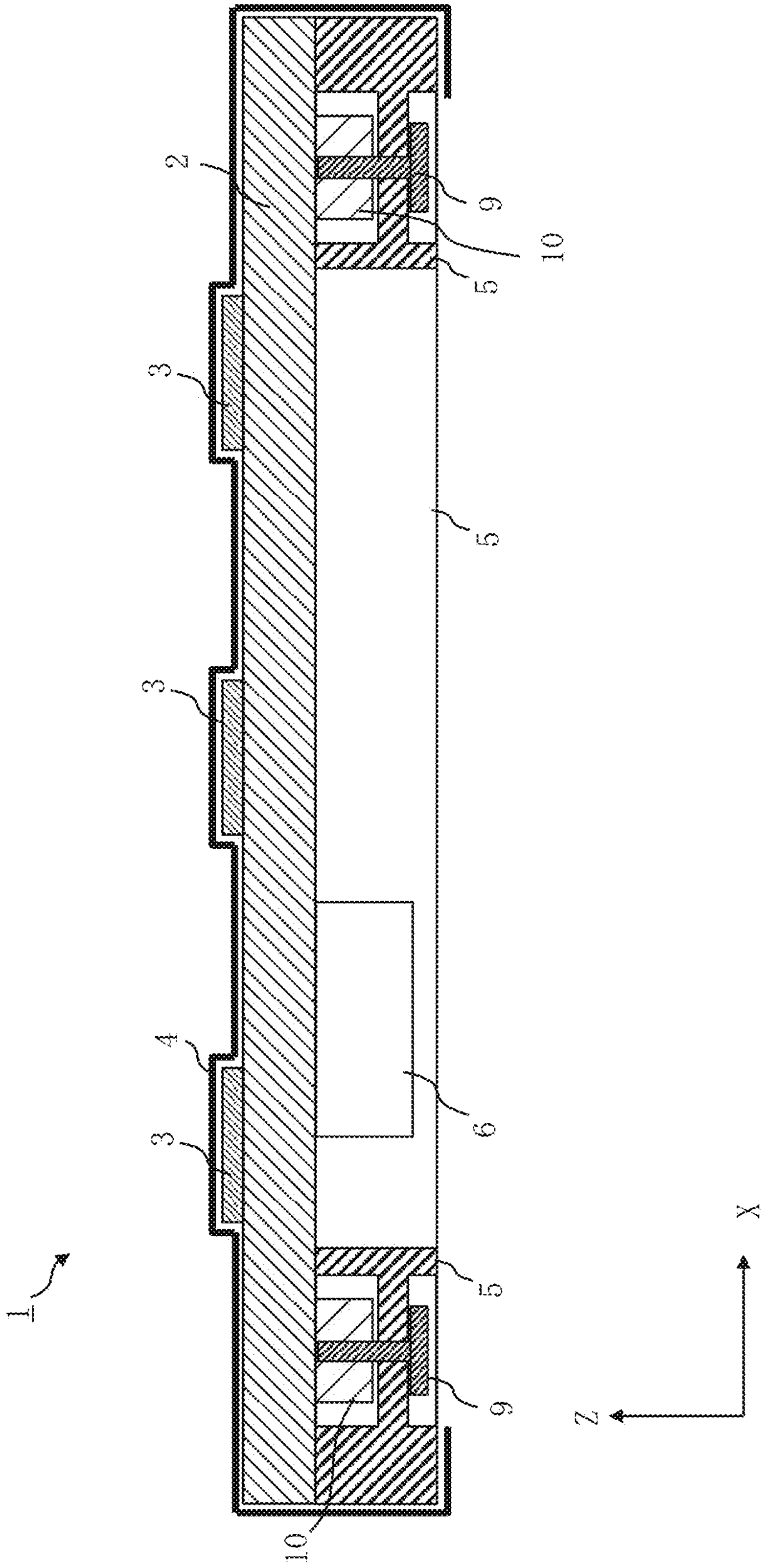
FIG. 17 is a side cross-sectional diagram of the antenna structure 1 according to Embodiment 1.

FIG. 17 illustrates a specific example of a side cross-sectional diagram of the antenna structure 1 according to this variation. In this figure, cross sections of the screws 9 and substrate taps 10 are visible in addition to those illustrated in FIG. 4. In this variation, the substrate taps 10 for installing the screws 9 are provided on the wiring substrate 2 back face side, and recessed portions are provided at part of the outer peripheral portion of the support 5 back face so that the heads of the screws 9 do not protrude from the antenna structure 1 back face. In this variation, the antenna substrate 23 and the support 5 are fastened and fixed by inserting and installing the screws 9 from the support 5 back face side. The screws 9 and the substrate taps 10 may be installed without crossing the AA cross section. The screws 9 may pass through the wiring substrate 2.

The film 4 is attached from the entire face of the radio wave emitting face of the antenna substrate 23 so as to wrap the side faces of the antenna substrate 23 to the edge portion of the outer peripheral portion of the support 5 back face.

In this variation, since the screws 9 are inserted from the support 5 back face side so as to fasten the antenna substrate 23 and the support 5, the waterproof distance is shortened when the fastening sections of the screws 9 are covered by the film 4. The waterproof distance here is the shortest distance from the end of the film 4 attached to the antenna structure 1 to the through holes of the screws 9. Therefore, it is desirable to separately waterproof the fastening sections of the screws 9 with resin or the like.

Instead of covering the fastening sections of the screws 9 by the film 4, a waterproof process may be separately performed for the fastening sections, such as installing the packing 7 in FIG. 5 in an outer side of the fastening sections so that the fastening sections are contained within the packing 7.

<Variation 4>

Figure 18:
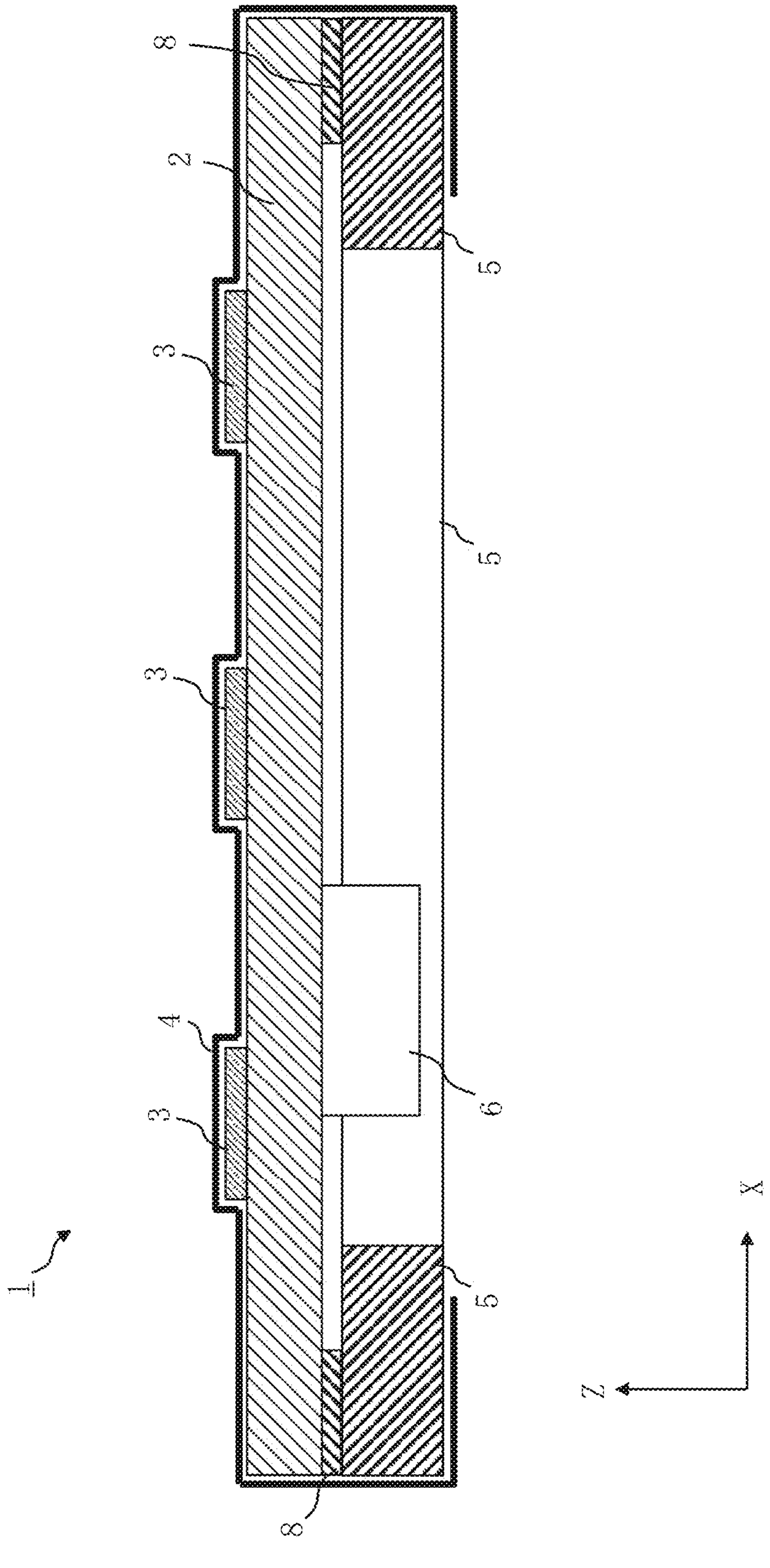
FIG. 18 is a side cross-sectional diagram of the antenna structure 1 according to Embodiment 1.

FIG. 18 illustrates a specific example of a side cross-sectional diagram of the antenna structure 1 according to this variation. In this figure, cross sections of an adhesive 8 is visible in addition to those illustrated in FIG. 4. In this variation, the antenna substrate 23 is fixed to the support 5 with the adhesive 8. The adhesive 8 may be applied to the entire area between the antenna substrate 23 and the support 5, or may be applied to only part of the area.

The film 4 is attached from the entire face of the radio wave emitting face of the antenna substrate 23 so as to wrap the side faces of the antenna substrate 23 to the edge portion of the outer peripheral portion of the support 5 back face.

The antenna substrate 23 and the support 5 may be fixed using both the screws 9 and the adhesive 8. The substrate back face may be fixed to the support 5 that covers the outer peripheral portion of the substrate back face with at least one of the screws 9 and the adhesive 8.

Embodiment 2

Differences from the above embodiment will be mainly described below with reference to the drawings.

Description of Configuration

Figure 19:
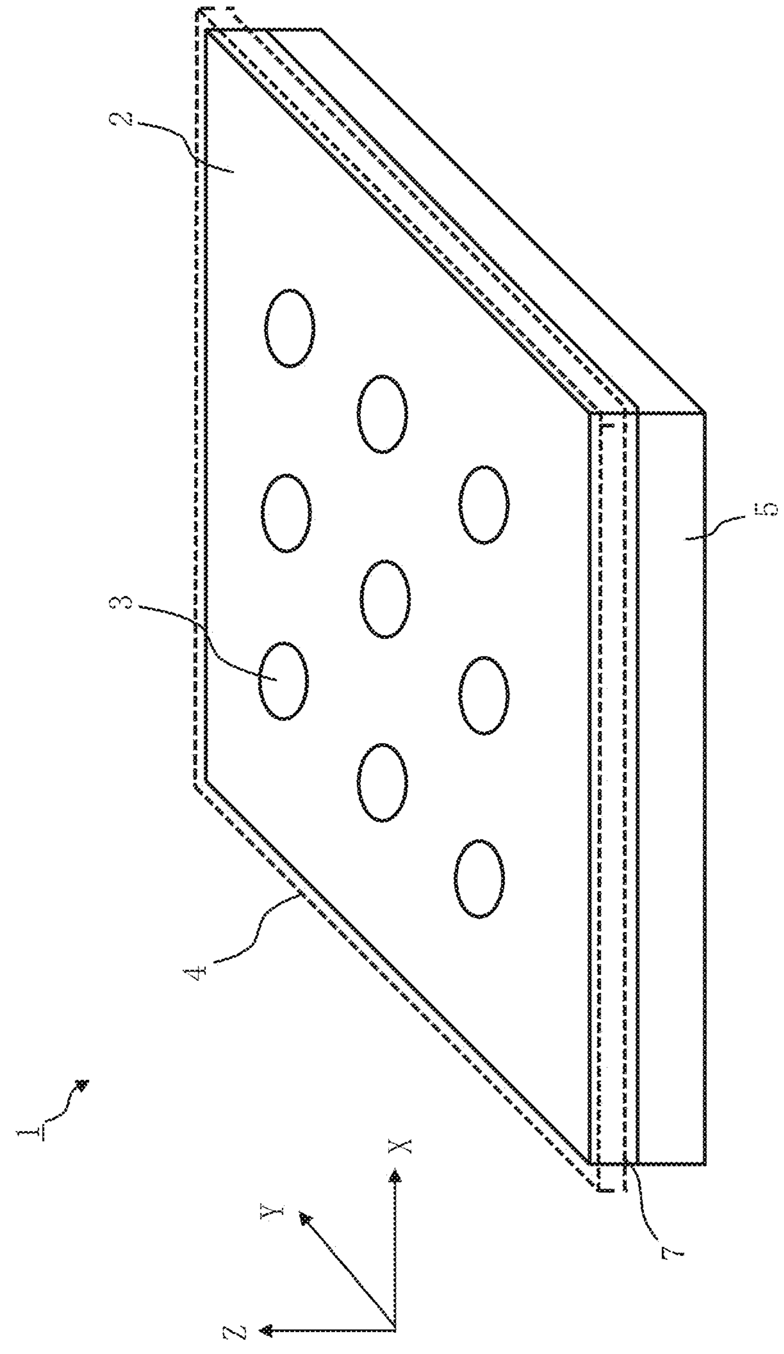
FIG. 19 is a perspective view diagram of the antenna structure 1 according to Embodiment 2.

FIG. 19 illustrates a specific example of a perspective view diagram of the antenna structure 1 according to this embodiment. The antenna structure 1 according to this embodiment includes the packing 7.

The film 4 is attached to at least the radio wave emitting face, the plurality of substrate side faces, and the edge portion of the outer peripheral portion of the substrate back face. The film 4 is attached so as to cover at least the side faces, the top face, and part of the bottom face of the antenna substrate 23, and is not attached to the support 5.

The packing 7 is installed between the edge portion of the outer peripheral portion of the wiring substrate 2 back face and the edge portion of the outer peripheral portion of the surface of the support 5.

Figure 20:
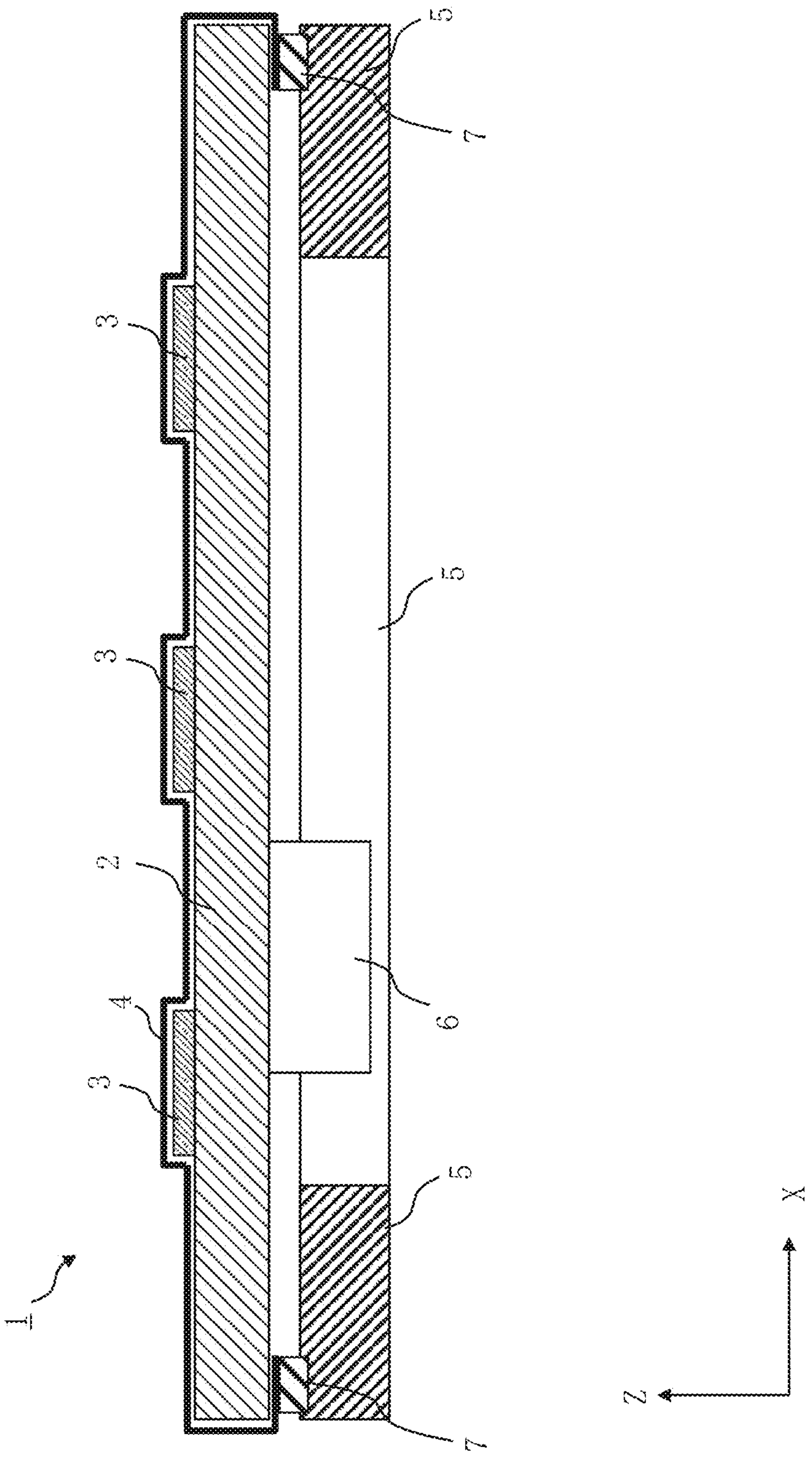
FIG. 20 is a side cross-sectional diagram of the antenna structure 1 according to Embodiment 2.

FIG. 20 illustrates a specific example of a side cross-sectional diagram of the antenna structure 1 according to this embodiment. In this figure, main differences from the antenna structure 1 according to Embodiment 1 are the area where the film 4 is attached and that the packing 7 is visible.

The film 4 is attached from the entire face of the radio wave emitting face so as to wrap the entire face of each of the side faces of the antenna substrate 23 to the edge portion of the outer peripheral portion of the antenna substrate 23 back face.

The packing 7 is installed so as to bridge between the film 4 attached to the antenna substrate 23 back face and the top face of the support 5. A groove corresponding to the width of the packing 7 may be provided on the top face of the support 5, and part of the packing 7 may be fitted into the groove. The groove may be omitted. At least part of the packing 7 may be in contact with the antenna substrate 23. Between the antenna substrate 23 back face and the top face of the support 5, there is a gap whose height is the thickness of the packing 7 or a gap whose height is slightly narrower than this thickness. A height is a length in the upward direction.

Description of Operation

The film attachment process according to this embodiment is substantially the same as the film attachment process according to Embodiment 1. In the film attachment process according to this embodiment, the film 4 is attached to the antenna substrate 23 instead of the antenna structure 1. The antenna substrate 23 to which at least one of the films to be attached has not been attached may be simply called the antenna substrate 23.

The description of the film attachment process according to this embodiment is one where the antenna structure 1 and each constituent element of the antenna structure 1 in the description of the film attachment process according to Embodiment 1 is suitably interpreted as the antenna substrate 23 or each constituent element of the antenna substrate 23 and also the description related to the antenna structure 1 is suitably omitted.

Description of Effects of Embodiment 2

As described above, according to this embodiment, the packing 7 is placed between the film 4 attached to the edge portion of the outer peripheral portion of the antenna substrate 23 back face and the support 5. Therefore, the waterproofness of the antenna structure 1 is secured.

The film 4 is attached as described above, so that the film 4 that is wrapped from the side faces of the antenna substrate 23 to the edge portion of the outer peripheral portion of the antenna substrate 23 back face acts as an anchor, and this can reduce a risk that the film 4 will peel off due to deformation caused by thermal expansion of the wiring substrate 2 or the like.

The film 4 is wrapped from the side faces of the antenna substrate 23 to the edge portion of the outer peripheral portion of the antenna substrate 23 back face, so that the waterproof distance can be lengthened, and as a result, the waterproofness of the antenna structure 1 is enhanced.

Other Configurations

<Variation 5>

Figure 21:
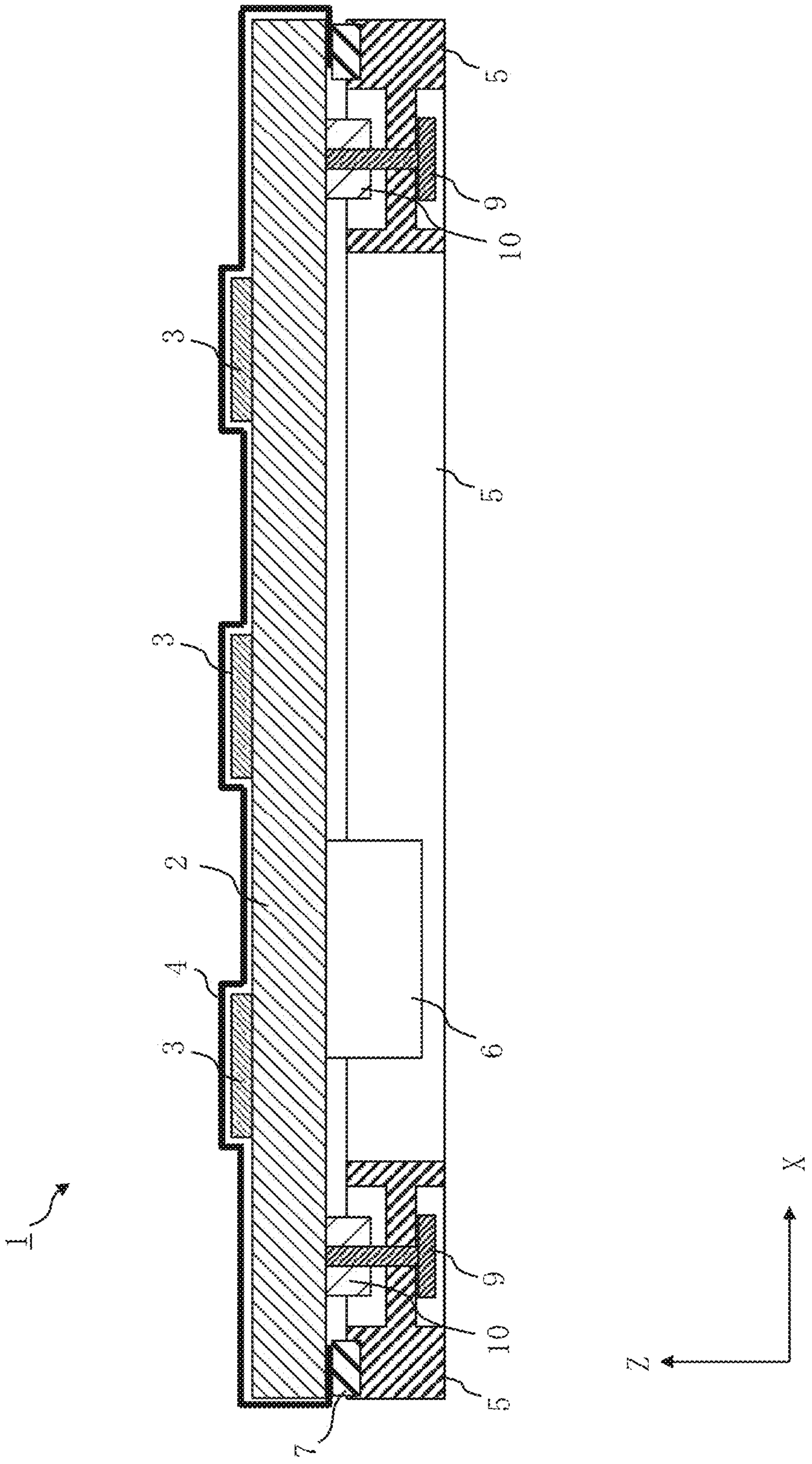
FIG. 21 is a side cross-sectional diagram of the antenna structure 1 according to Embodiment 2.

FIG. 21 illustrates a specific example of a side cross-sectional diagram of the antenna structure 1 according to this variation. This variation is a combination of the antenna structure 1 according to this embodiment and the antenna structure 1 according to Variation 3.

The fastening sections of the screws 9 may be waterproofed by placing packing between the screws 9 and the support 5. A waterproof process such as filling resin into the fastening sections of the screws 9 on the support 5 back face may be performed.

<Variation 6>

Figure 22:
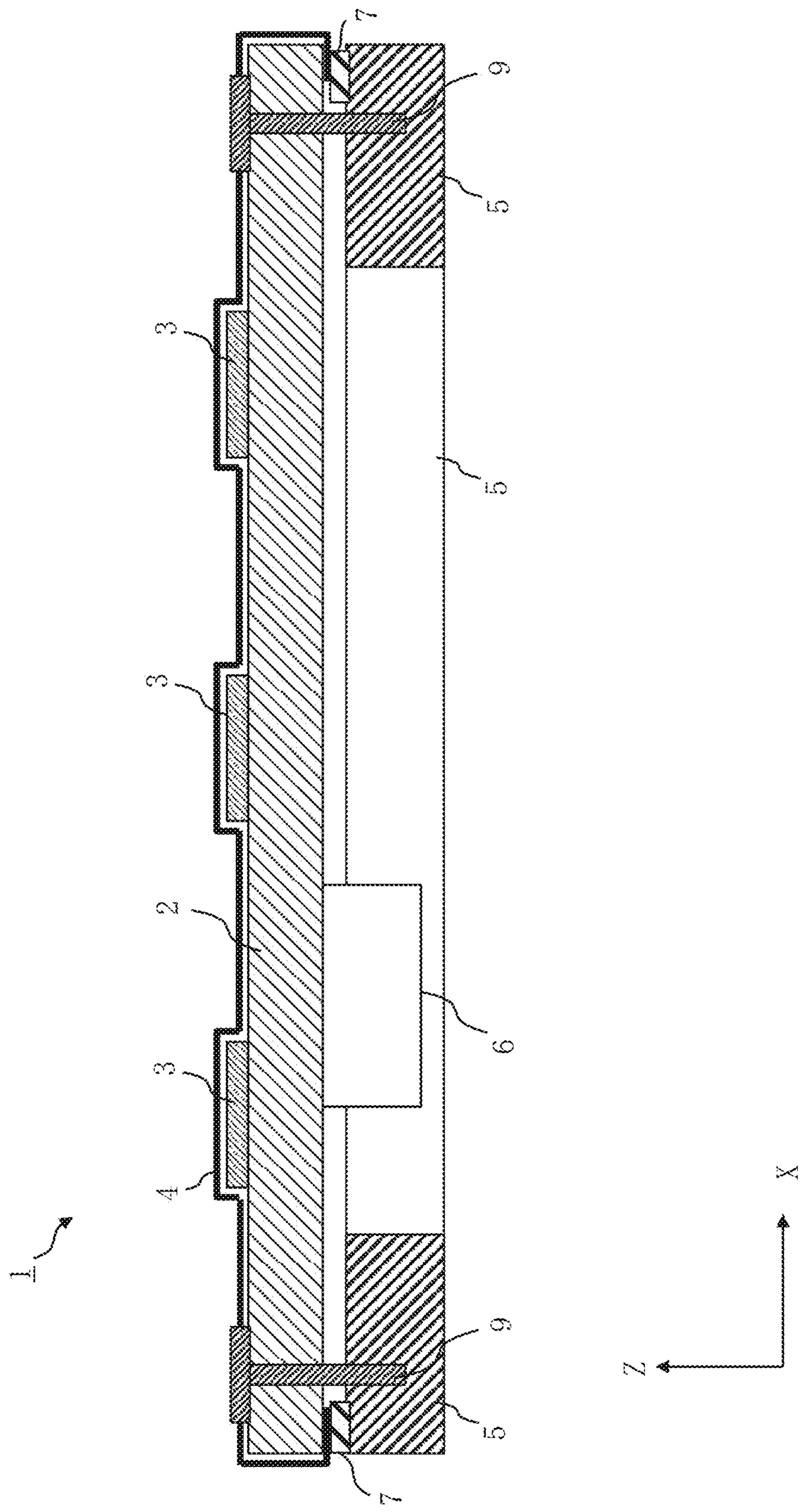
FIG. 22 is a side cross-sectional diagram of the antenna structure 1 according to Embodiment 2.

FIG. 22 illustrates a specific example of a side cross-sectional diagram of the antenna structure 1 according to this variation. In this figure, cross sections of the screws 9 are visible in addition to those illustrated in FIG. 20. In this variation, the antenna substrate 23 and the support 5 are fastened and fixed by inserting and installing the screws 9 from the top face side of the antenna substrate 23. In this case, the screws 9 pass through the film 4, so that holes are made in the film 4. Therefore, it is desirable that portions of the film 4 through which the screws 9 have passed and areas around these portions be waterproofed using resin or the like.

<Variation 7>

Figure 23:
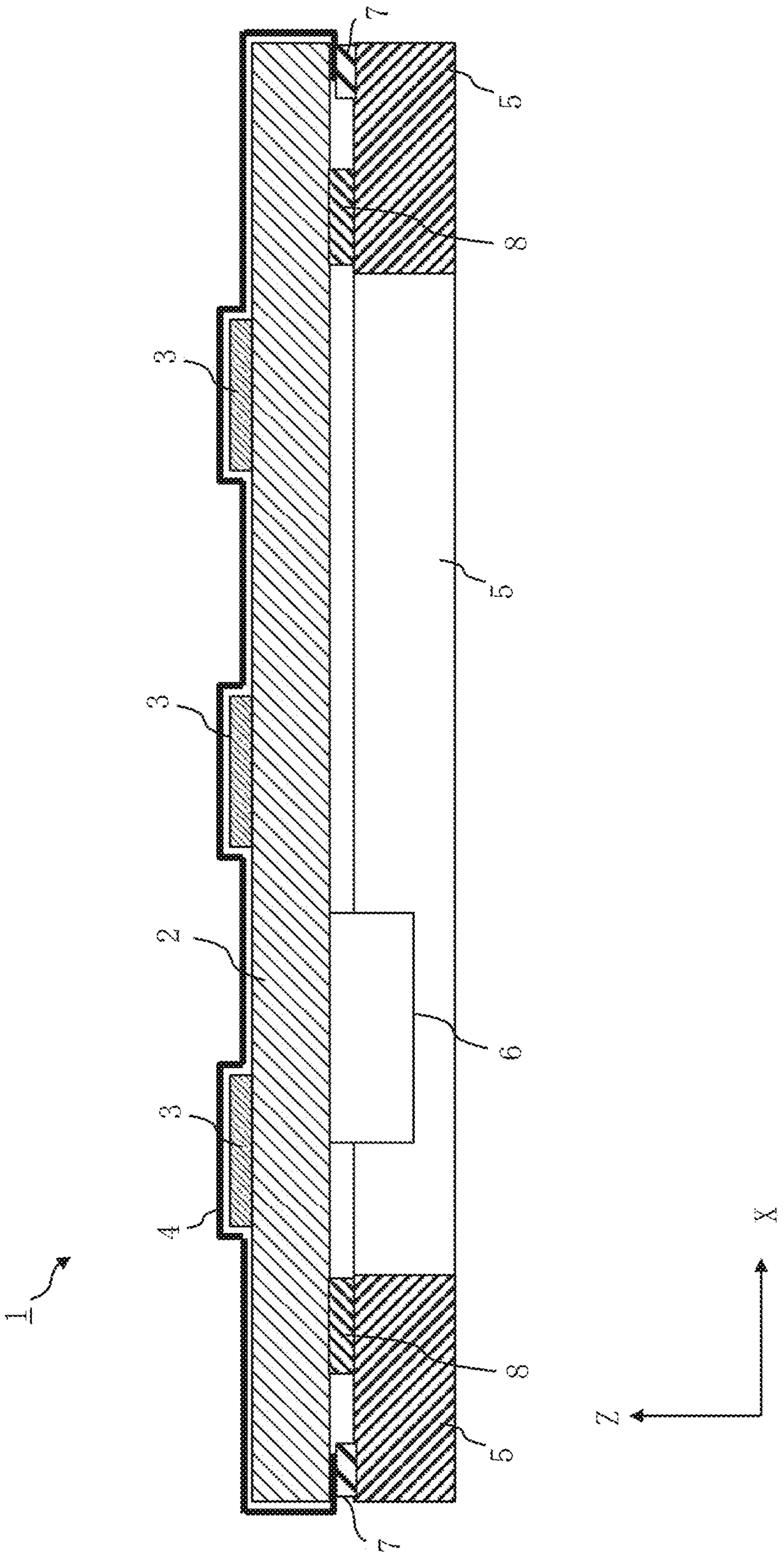
FIG. 23 is a side cross-sectional diagram of the antenna structure 1 according to Embodiment 2.

FIG. 23 illustrates a specific example of a side cross-sectional diagram of the antenna structure 1 according to this variation. This variation is a combination of the antenna structure 1 according to this embodiment and the antenna structure 1 according to Variation 4.

The adhesive 8 is applied to at least part of an area between the wiring substrate 2 and the support 5 where the packing 7 is not installed.

Embodiment 3

Differences from the above embodiments will be mainly described below with reference to the drawings.

Description of Configuration

Figure 24:
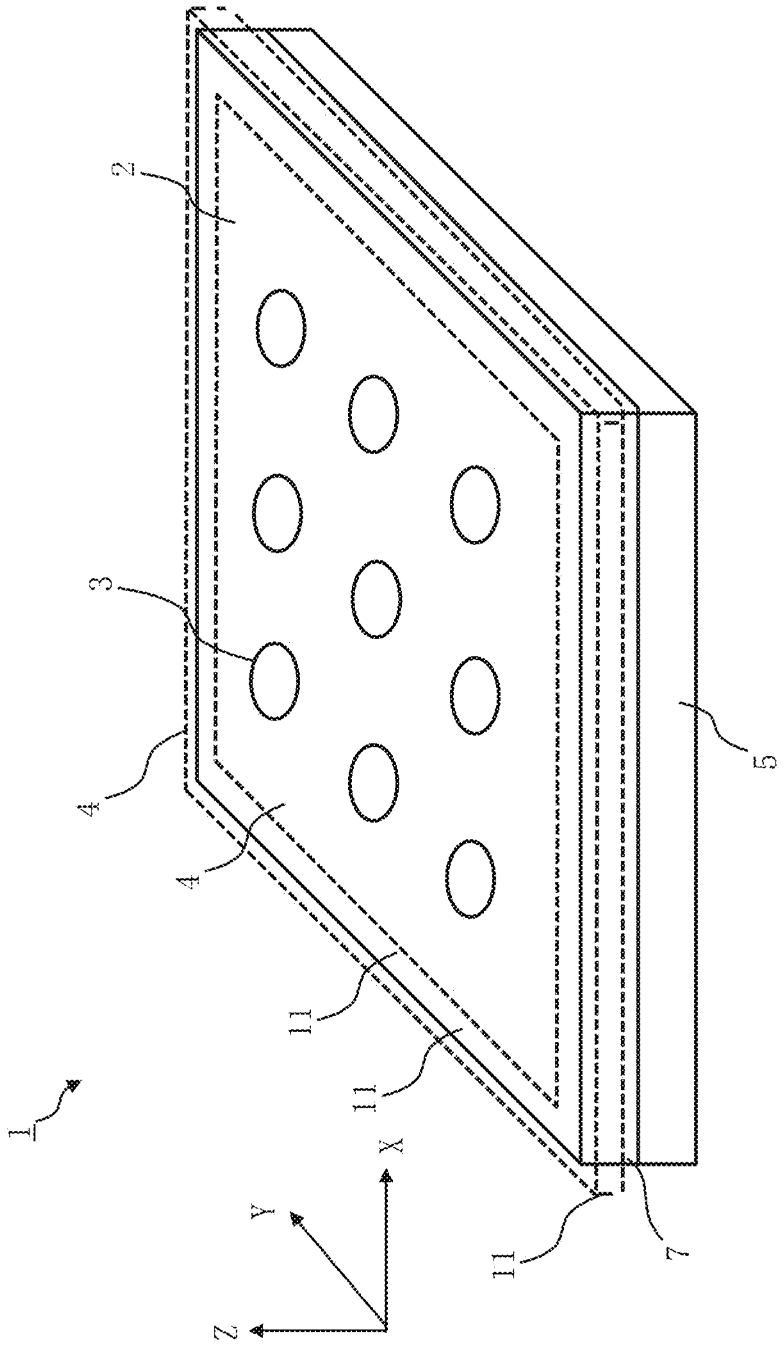
FIG. 24 is a perspective view diagram of the antenna structure 1 according to Embodiment 3.

FIG. 24 illustrates a specific example of a perspective view diagram of the antenna structure 1 according to this embodiment. The antenna structure 1 according to this embodiment is the antenna substrate 23 according to Embodiment 2 to which a film 11 is attached. Part of the film 4 and part of the film 11 overlap each other. Folds and ends of the film 11 are indicated by dashed lines. The packing 7 does not need to be visible from obliquely above.

The film 11 is a single film, and is attached to at least the substrate back face and the plurality of substrate side faces so as to cover at least part of the first film. The film 11 is also called a second film.

Figure 25:
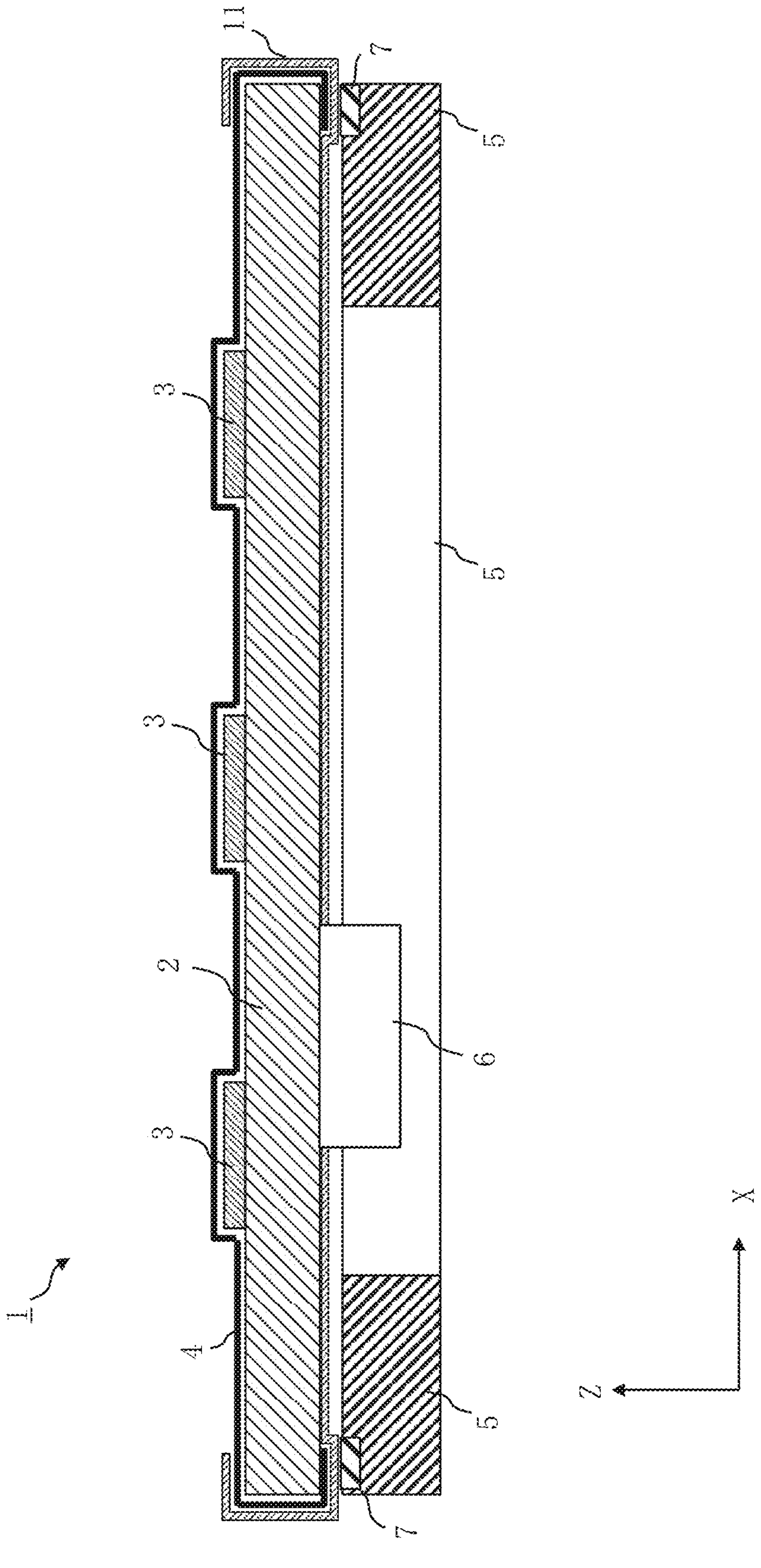
FIG. 25 is a side cross-sectional diagram of the antenna structure 1 according to Embodiment 3.

FIG. 25 illustrates a specific example of a side cross-sectional diagram of the antenna structure 1 according to this embodiment. Differences from the side cross-sectional diagram of the antenna structure 1 according to Embodiment 2 will be described.

The film 11 is attached so as to overlap at least part of the first film. As a specific example, the film 11 is attached from the entire face of the back face of the antenna substrate 23 so as to wrap the side faces of the antenna substrate 23 to the edge portion of the outer peripheral portion of the top face of the antenna substrate 23, so as to overlap part of the film 4. In this figure, the film 11 is attached so as to overlap part of the film 4, but the film 11 may be attached so that the film 4 covers the film 11.

The portion of the film 11 to enclose the connector 6 is opened by trimming. This allows the connector 6 to be connected to the antenna substrate 23.

Description of Operation

Figure 26:
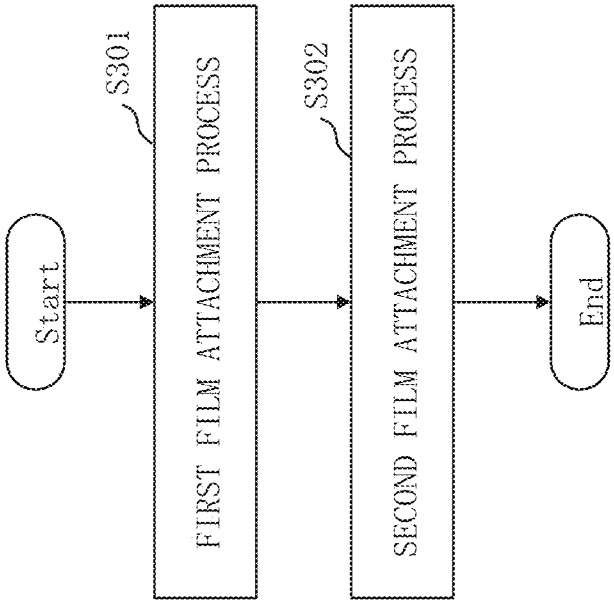
FIG. 26 is a flowchart illustrating a film attachment process according to Embodiment 3.

FIG. 26 is a flowchart illustrating an example of the film attachment process according to this embodiment. Using this figure, an example of the film attachment process will be described.

(Step S301: First Film Attachment Process)

The film 4 is attached to the antenna substrate 23, as in the film attachment process according to Embodiment 2.

(Step S302: Second Film Attachment Process)

In order for the top face of the antenna substrate 23 to which the film 4 has been attached to be in contact with the top face of the film forming jig 18, the antenna substrate 23 is placed with the top face facing downward on the film forming jig 18.

Then, the film 11 is attached to the antenna substrate 23, as in the first film attachment process. The description of this process is one where the film 4 in the description of the first film attachment process is suitably interpreted as the film 11.

Description of Effects of Embodiment 3

As described above, according to this embodiment, the waterproofness of the antenna structure 1 is secured by inserting the packing 7 between the film 11 and the support 5 on the back face side of the antenna substrate 23.

According to this embodiment, the antenna substrate 23 is covered with the film 4 and the film 11, so that the enhanced waterproofness of the antenna substrate 23 can be secured. In addition, attaching the two layers of films to the side faces of the antenna substrate 23 reduces a risk that the film 4 will peel off at the edge portion of the antenna substrate 23 and reduces a risk that the film 4 will rupture.

Other Configurations

<Variation 8>

Figure 27:
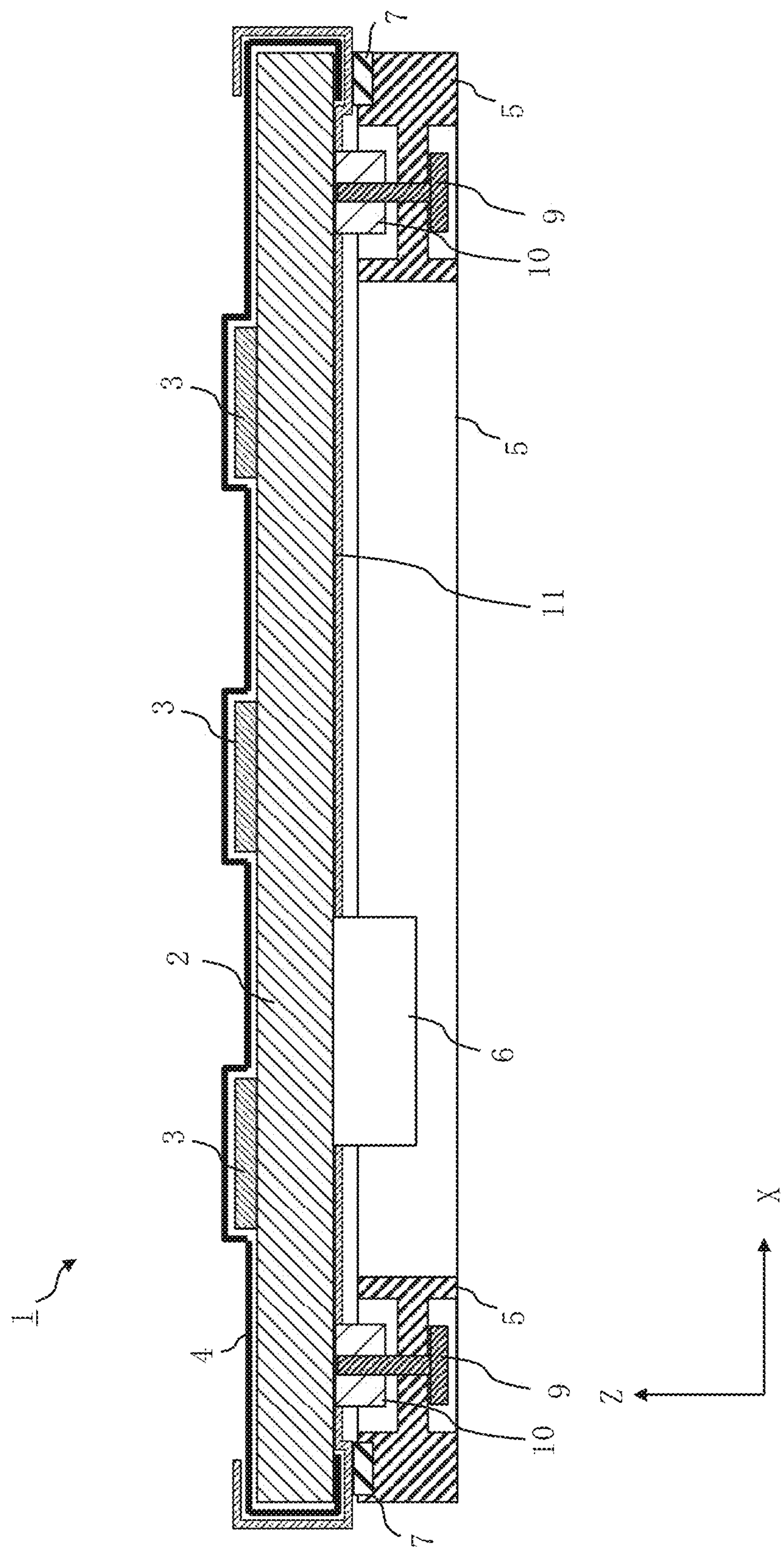
FIG. 27 is a side cross-sectional diagram of the antenna structure 1 according to Embodiment 3.

FIG. 27 illustrates a specific example of a side cross-sectional diagram of the antenna structure 1 according to this variation. This variation is a combination of the antenna structure 1 according to this embodiment and the antenna structure 1 according to Variation 5.

In this figure, the substrate taps 10 are installed by making holes at part of the film 11. The areas around the boundaries between the substrate taps 10 and the antenna substrate 23 may be waterproofed by resin or the like. The substrate taps 10 may be installed on the film 11.

<Variation 9>

Figure 28:
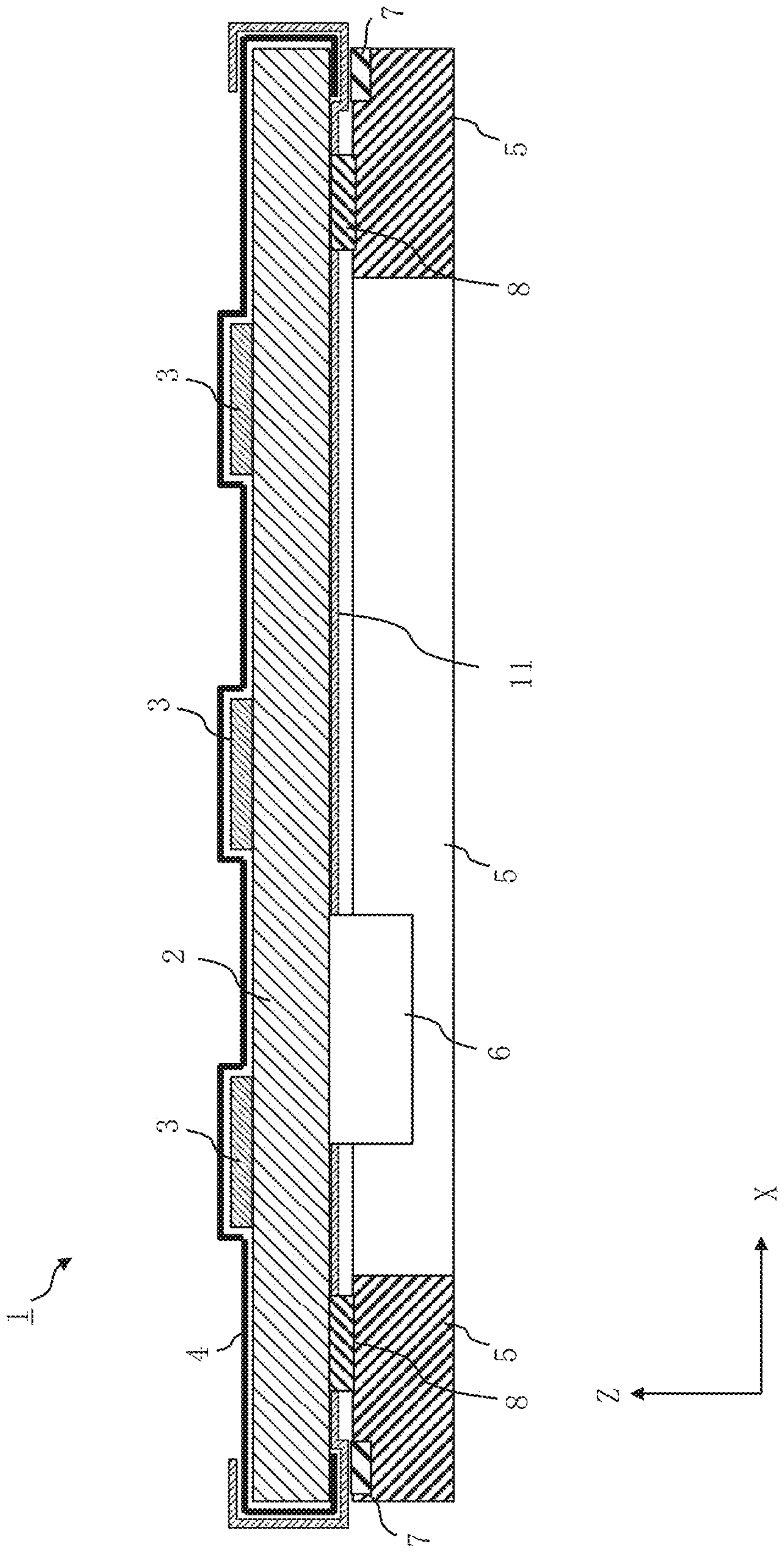
FIG. 28 is a side cross-sectional diagram of the antenna structure 1 according to Embodiment 3.

FIG. 28 illustrates a specific example of a side cross-sectional diagram of the antenna structure 1 according to this variation. This variation is a combination of the antenna structure 1 according to this embodiment and the antenna structure 1 according to Variation 7.

The adhesive 8 may be applied on the film 11.

Embodiment 4

Differences from the above embodiments will be mainly described below with reference to the drawings.

Description of Configuration

Figure 29:
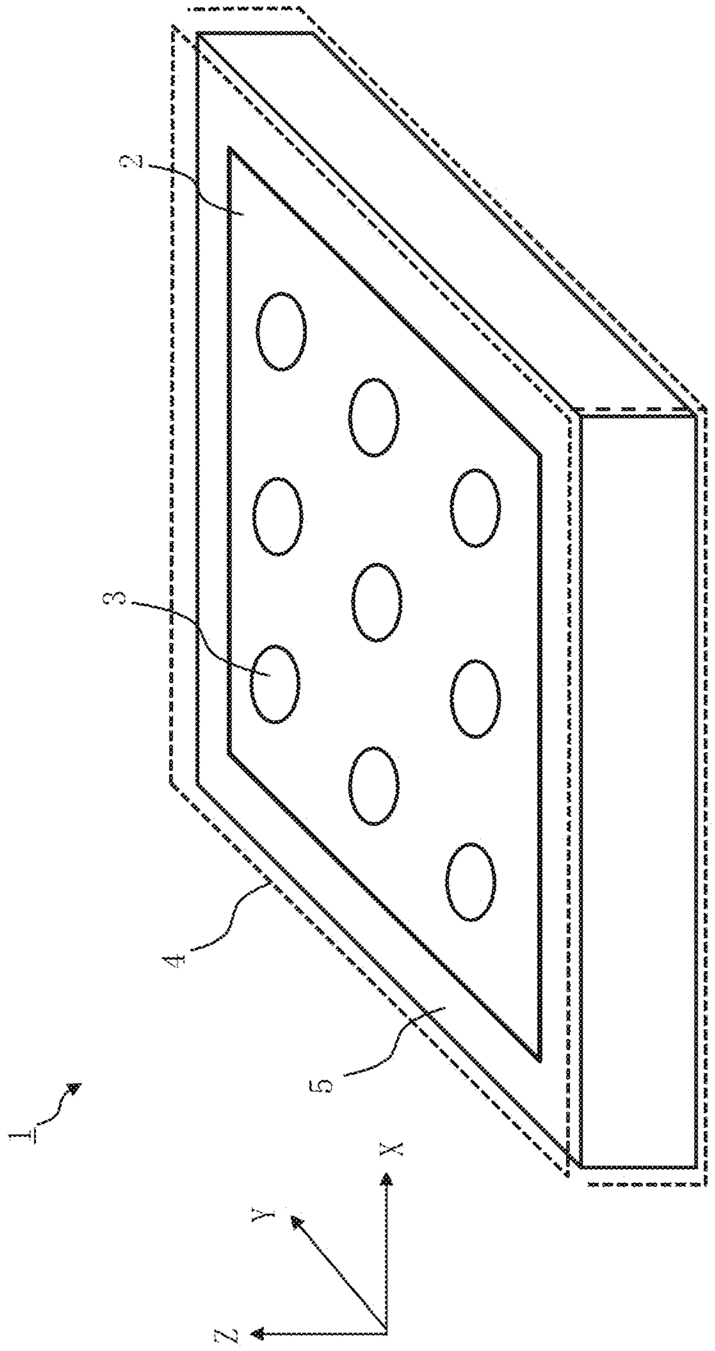
FIG. 29 is a perspective view diagram of the antenna structure 1 according to Embodiment 4.

FIG. 29 illustrates a specific example of a perspective view diagram of the antenna structure 1 according to this embodiment. As illustrated in this figure, the support 5 is attached so as to cover the side faces of the antenna substrate 23. That is, the support 5 covers the plurality of substrate side faces. Other constituent elements of the antenna structure 1 according to this embodiment are substantially the same as those according to Embodiment 1.

Figure 30:
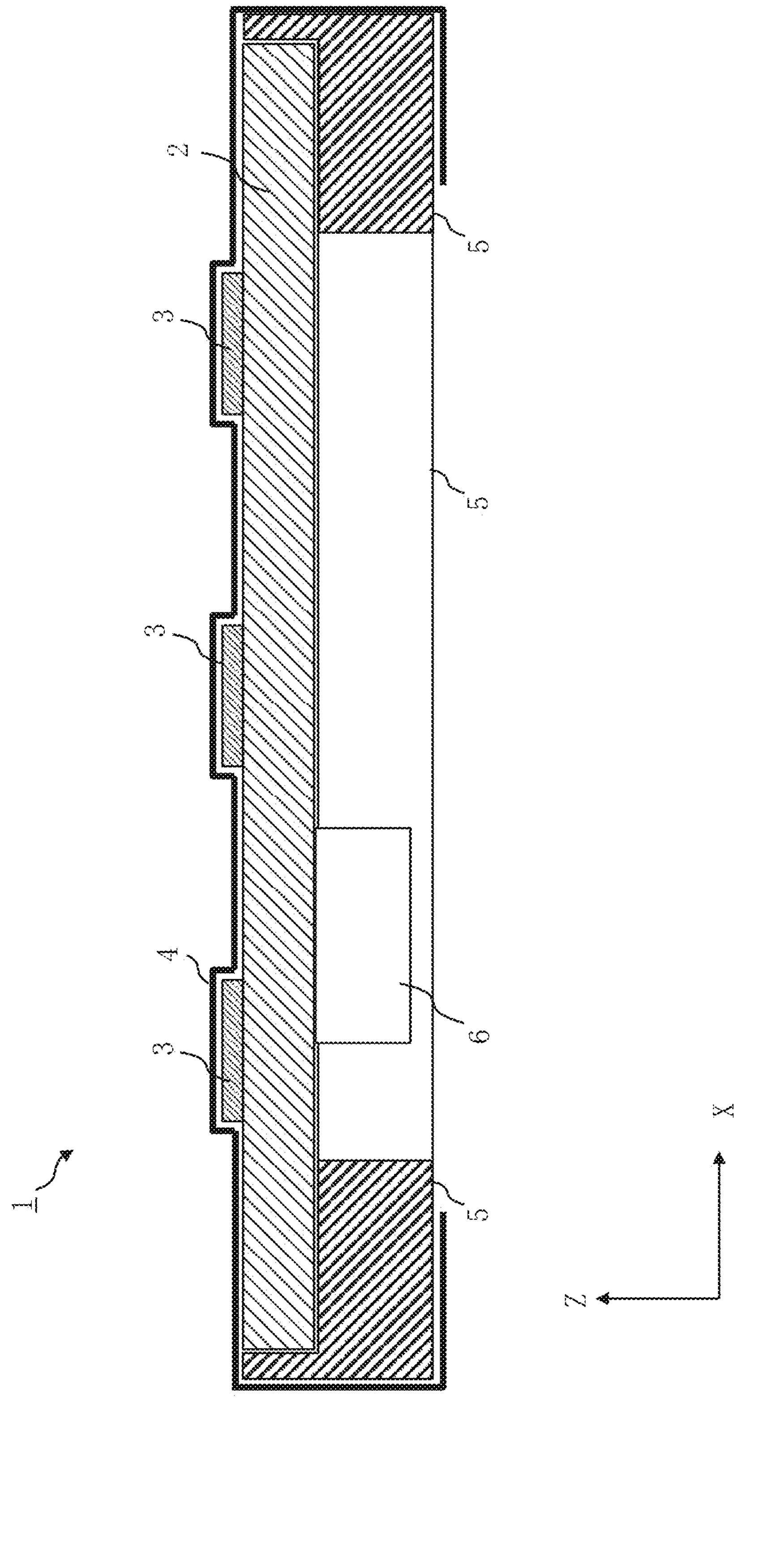
FIG. 30 is a side cross-sectional diagram of the antenna structure 1 according to Embodiment 4.

FIG. 30 illustrates a specific example of a side cross-sectional diagram of the antenna structure 1 according to this embodiment. In the antenna structure 1 according to this embodiment, the side faces of the antenna substrate 23 are covered by the support 5, unlike the antenna structure 1 according to Embodiment 1.

The film 4 is attached from the entire face of the radio wave emitting face of the antenna substrate 23 so as to wrap the edge portion of the top face of the support 5 and the side faces of the support 5 to the edge portion of the outer peripheral portion of the support 5 back face, so as to form the antenna structure 1.

Description of Operation

The film attachment process according to this embodiment is substantially the same as the film attachment process according to Embodiment 1.

Effects of Embodiment 4

As described above, according to this embodiment, the side faces of the antenna substrate 23 are covered by the support 5, so that the edge portion of the antenna substrate 23 is protected.

According to this embodiment, the film 4 is attached from the entire face of the radio wave emitting face of the antenna substrate 23 so as to wrap the edge portion of the top face of the support 5 and the side faces of the support 5 to the edge portion of the outer peripheral portion of the support 5 back face. As a result, the film 4 acts as an anchor, and this reduces a risk that the film 4 will peel off due to deformation caused by thermal expansion of the wiring substrate 2 or the like.

Other Configurations

<Variation 10>

Figure 31:
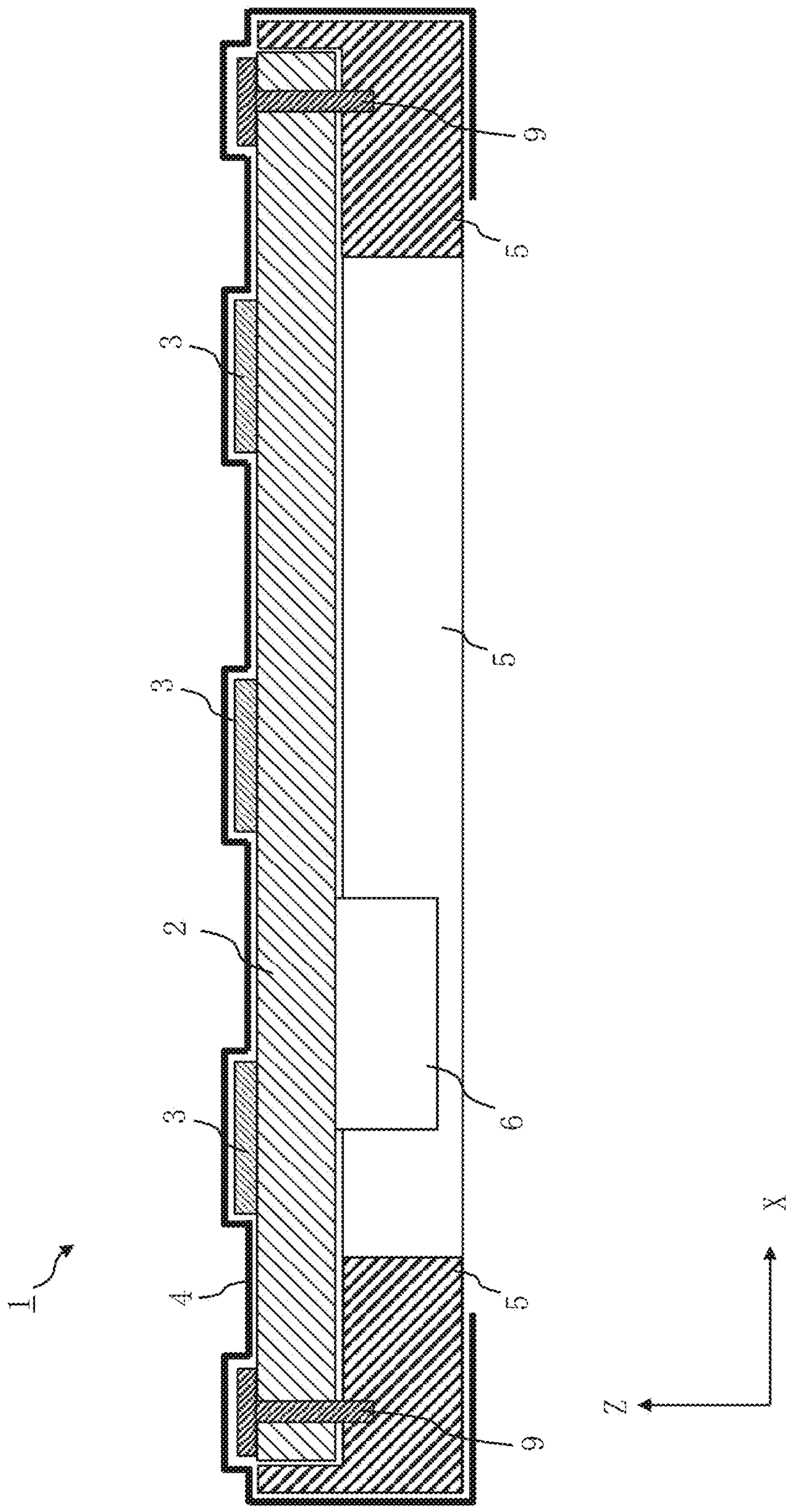
FIG. 31 is a side cross-sectional diagram of the antenna structure 1 according to Embodiment 4.

FIG. 31 illustrates a specific example of a side view diagram of the antenna structure 1 according to this variation. This variation is a combination of the antenna structure 1 according to this embodiment and the antenna structure 1 according to Variation 2.

<Variation 11>

Figure 32:
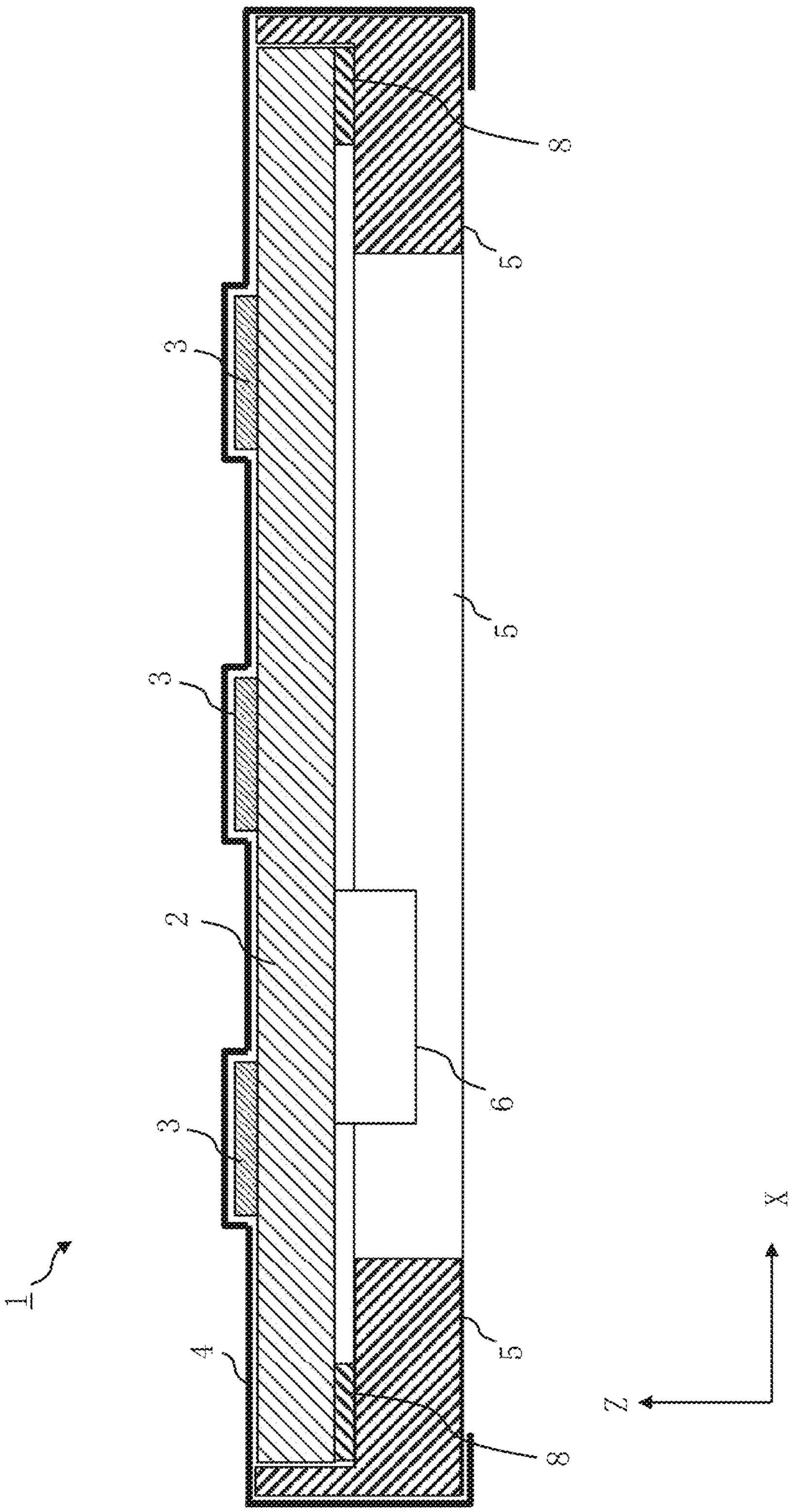
FIG. 32 is a side cross-sectional diagram of the antenna structure 1 according to Embodiment 4.

FIG. 32 illustrates a specific example of a side view diagram of the antenna structure 1 according to this variation. This variation is a combination of the antenna structure 1 according to this embodiment and the antenna structure 1 according to Variation 4.

The film 4 is attached from the entire face of the radio wave emitting face of the antenna substrate 23 so as to wrap the edge portion of the surface of the support 5 and the side faces of the support 5 to the edge portion of the outer peripheral portion of the support 5 back face.

Other Embodiments

The above embodiments can be freely combined, or any constituent element of each of the embodiments can be modified. Alternatively, in each of the embodiments, any constituent element can be omitted.

The embodiments are not limited to those presented in Embodiments 1 to 4, and various modifications can be made as needed. The procedures described using the flowcharts or the like may be suitably modified.

REFERENCE SIGNS LIST

1: antenna structure, 2: wiring substrate, 3: antenna element, 4: film, 5: support, 6: connector, 7: packing, 8: adhesive, 9: screw, 10: substrate tap, 11: film, 12: attachment target, 13: upper chamber, 14: lower chamber, 15: heater, 16: frame, 17: stage, 18: film forming jig, 19: compressor, 20: vacuum pump, 21: pipe, 22: antenna mounting member, 23: antenna substrate, 30: machine housing, 31: elevating section.

The invention claimed is:

1. An antenna structure comprising:

an antenna substrate that includes a wiring substrate on which electric wiring is formed, the wiring substrate including a radio wave emitting face that is a face including an antenna element and a substrate back face that is a face opposite to the radio wave emitting face; and a support to support the antenna substrate and support at least an outer peripheral portion of the substrate back face, wherein the antenna substrate includes a plurality of substrate side faces that are faces in contact with the radio wave emitting face, wherein the antenna structure comprises a structure surface that is a face including the radio wave emitting face, a plurality of structure side faces that are faces in contact with the structure surface, and a structure back face that is a face opposite to the structure surface and in contact with the plurality of structure side faces wherein a first film, which is a single film to cover an entire face of the structure surface, the plurality of structure side faces or the plurality of substrate side faces, and an edge portion of an outer peripheral portion of the structure back face or the substrate back face, is attached to the structure surface, the plurality of structure side faces, and the edge portion of the outer peripheral portion of the structure back face, and wherein a single opening portion that is an area where the first film is not attached is provided in the structure back face or the substrate back face.

2. The antenna structure according to claim 1, wherein a second film, which is a single film, is attached to at least the substrate back face and the plurality of substrate side faces so as to overlap at least part of the first film.

3. The antenna structure according to claim 1, wherein the substrate back face is fixed to a support that covers the outer peripheral portion of the substrate back face with at least one of a screw and an adhesive.

4. The antenna structure according to claim 2, wherein the substrate back face is fixed to a support that covers the outer peripheral portion of the substrate back face with at least one of a screw and an adhesive.

5. The antenna structure according to claim 1, wherein the support covers the plurality of substrate side faces.

6. The antenna structure according to claim 1, wherein the antenna substrate is fixed to the support with at least one of a screw and an adhesive.

7. The antenna structure according to claim 5, wherein the antenna substrate is fixed to the support with at least one of a screw and an adhesive.

* * * * *